(12) United States Patent
M S et al.

(10) Patent No.: US 12,385,525 B2
(45) Date of Patent: Aug. 12, 2025

(54) MAGNETIC THRUST BEARING SYSTEMS

(71) Applicant: General Electric Company, Schenectady, NY (US)

(72) Inventors: Anand M S, Bengaluru (IN); Ravindra Shankar Ganiger, Bengaluru (IN); David Raju Yamarthi, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 116 days.

(21) Appl. No.: 18/331,698

(22) Filed: Jun. 8, 2023

(65) Prior Publication Data
US 2024/0337290 A1    Oct. 10, 2024

(30) Foreign Application Priority Data

Apr. 6, 2023 (IN) .............................. 202311025954

(51) Int. Cl.
*F16C 32/04* (2006.01)
*H02K 7/09* (2006.01)

(52) U.S. Cl.
CPC ........... *F16C 32/0474* (2013.01); *H02K 7/09* (2013.01); *H02K 2205/03* (2013.01)

(58) Field of Classification Search
CPC ................. F16C 32/0474; H02K 2205/03
See application file for complete search history.

(56) References Cited

U.S. PATENT DOCUMENTS

| | | | |
|---|---|---|---|
| 3,347,262 A | 10/1967 | Gibson | |
| 6,213,736 B1 | 4/2001 | Weisser | |
| 6,811,135 B2 | 11/2004 | Moreno et al. | |
| 6,986,647 B2 | 1/2006 | Jones et al. | |
| 7,140,393 B2 | 11/2006 | Sheydayi | |

(Continued)

FOREIGN PATENT DOCUMENTS

| EP | 2037121 A1 * | 3/2009 | ............. F03D 80/70 |
|---|---|---|---|
| EP | 2282091 | 6/2017 | |

(Continued)

OTHER PUBLICATIONS

JP-2002130256-A_translate (Year: 2002).*

(Continued)

*Primary Examiner* — Tulsidas C Patel
*Assistant Examiner* — Mohammed Ahmed Qureshi
(74) *Attorney, Agent, or Firm* — HANLEY, FLIGHT & ZIMMERMAN, LLC

(57) ABSTRACT

Magnetic thrust bearing systems are disclosed. Examples disclosed herein include a thrust bearing system comprising a thrust disc protruding radially outward from a shaft, the thrust disc including a first magnet, the first magnet including a first pole at a forward side of the thrust disc and a second pole at an aft side, a first thrust pad positioned on the forward side, the first thrust pad including a second magnet adjacent to a first surface of the first thrust pad, the first surface facing the thrust disc, the second magnet including a third pole, the third and first pole having the same polarity, and a second thrust pad including a third magnet adjacent to a second surface of the second thrust pad, the second surface facing the thrust disc, the third magnet including a fourth pole, the fourth and second pole having the same polarity.

19 Claims, 10 Drawing Sheets

(56) References Cited

U.S. PATENT DOCUMENTS

| | | | |
|---|---|---|---|
| 7,186,093 | B2 | 3/2007 | Goshi |
| 7,249,939 | B2 | 7/2007 | Yanagihara |
| 11,098,817 | B1 | 8/2021 | Eddleman et al. |
| 11,137,144 | B2 | 10/2021 | Wilson et al. |
| 2018/0100543 | A1* | 4/2018 | Hyatt .................. F16C 32/0427 |

FOREIGN PATENT DOCUMENTS

| | | | |
|---|---|---|---|
| JP | S59186520 U | * | 12/1984 |
| JP | 2002130256 A | * | 5/2002 |
| JP | 2007092646 A | | 4/2007 |
| WO | 2015035006 | | 3/2015 |

OTHER PUBLICATIONS

JPS59186520U_translate (Year: 1984).*
Xu et al., "Numerical and Experimental Study on Air Thrust Foil Bearing Performance with Improved Structural Model Based on Real-time Taper Inlet Height", Research Square, Jul. 8, 2020, 26 pages.
Bruckner et al., "Analytic Modeling of the Hydrodynamic, Thermal, and Structural Behavior of Foil Thrust Bearings", NASA, Jun. 2005, 19 pages.
European Patent Office, "Extended European Search Report," issued in connection with European Patent Application No. 24168135.2, dated Sep. 16, 2024, 11 pages.

* cited by examiner

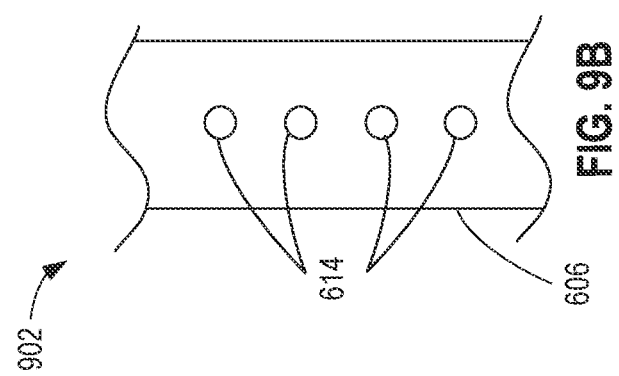
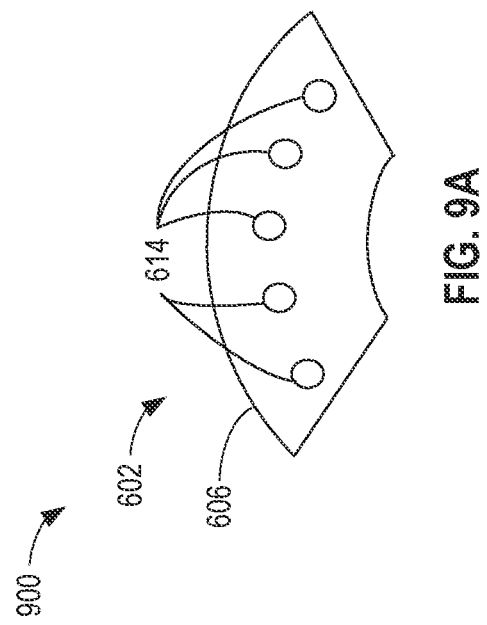

MAGNETIC THRUST BEARING SYSTEMS

RELATED APPLICATIONS

This patent claims the benefit of Indian Provisional Patent Application No. 202311025954, which was filed on Apr. 6, 2023. Indian Provisional Patent Application No. 202311025954 is hereby incorporated herein by reference in its entirety. Priority to India Provisional Patent Application No. 202311025954 is hereby claimed.

FIELD OF THE DISCLOSURE

This disclosure relates generally to fluid pumps, and, more particularly, to magnetic thrust bearing systems for fluid pumps.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

FIGS. 9A and 9B are a detailed views of portions of an example thrust disc constructed in accordance with teachings disclosed.

The figures are not to scale. In general, the same reference numbers will be used throughout the drawing(s) and accompanying written description to refer to the same or like parts.

DETAILED DESCRIPTION

Figure 1:
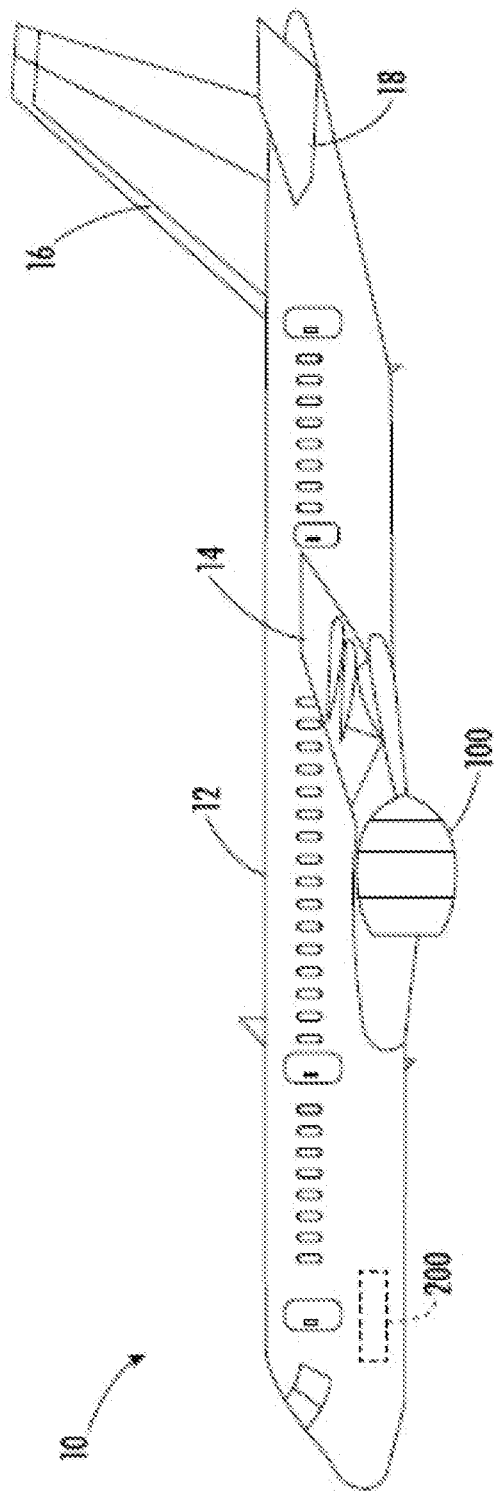
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B.

As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, in the context of describing the position and/or orientation of a first object relative to a second object, the term "substantially orthogonal" encompasses the term orthogonal and more broadly encompasses a meaning whereby the first object is positioned and/or oriented relative to the second object at an absolute angle of no more than five degrees (5°) from orthogonal. For example, a first axis that is substantially orthogonal to a second axis is positioned and/or oriented relative to the second axis at an absolute angle of no more than five degrees (5°) from orthogonal.

As used herein, "radially" is used to express a point or points along a radial vector originating at a central axis of a rotating body and pointing perpendicularly outward from the central axis. In some examples, fluid is said to accelerate radially outward from an impeller, meaning that the fluid flows outward from a central axis (axis of rotation) of the impeller at a direction that is substantially orthogonal to the central axis.

A centrifugal fluid pump moves fluid (e.g., fuel, water, oil, supercritical carbon dioxide (sCO2), etc.) through systems (e.g., waste heat recovery (WHR) systems) by converting rotational kinetic energy of an impeller to hydrodynamic energy of the flowing fluid. In other words, the angular velocity of the impeller is directly proportional to the flow rate of the flowing fluid exiting the pump. The impeller is provided a change in rotational kinetic energy from an electric motor applying mechanical work to an impeller shaft coupled to the impeller and to a rotor of an electric motor. The rotor is provided a change in mechanical work over a period of time (e.g., mechanical power) from a stator in the electric motor applying electromagnetic forces to the rotor in the form of torque. When the motor supplies a constant amount of electrical energy to the stator, then the rotor supplies a constant amount of mechanical energy to the impeller.

During operation of the pump, spinning of an impeller shaft and the associated impeller can cause the impeller shaft to radially vibrate within housing(s) of the pump. The pump housing(s) internally frame(s) radial bearings (e.g., hydrodynamic bearings, foil bearings, rolling-element bearings, etc.) to support radial loads (e.g., weight) of the impeller shaft and dampen the vibrations.

Also during pump operations, the impeller shaft may experience axial loads that act generally parallel to the central axis of the pump and/or impeller shaft. Axial loads acting on the impeller can be unbalanced, meaning that a forward axial load (e.g., axial load acting toward a forward portion of the pump) and an aft axial load (e.g., axial load acting toward an aft portion of the pump) can be unequal and produce an axial thrust of the impeller shaft. A forward or an aft axial thrust can cause the impeller shaft to shift along the central axis and cause parts coupled to the impeller shaft (e.g., impeller, rotor shaft, motor armature, etc.) to contact the housing(s), the motor, and/or other internal parts of the pump. The pump housing(s) include axial bearings (e.g., hydrodynamic bearings, foil bearings, etc.) that support axial thrusts of the impeller shaft and reduce, inhibit, and/or dampen such movements.

In some examples, the fluid (e.g., sCO2, oil, liquid helium, etc.) that the pump pressurizes in the system can be used to lubricate the radial and/or axial bearings to reduce frictional forces between rotating elements within those bearings. For example, the pump can include flowlines leading from a pump outlet to the axial bearings to provide and/or transmit pressurized fluid to a thrust bearing.

As used herein, a "flowline" can refer to a path (e.g., a flowpath, flow direction, etc.) of the fluid and/or a structure (e.g., pipe, casing, etc.) used to enclose (e.g., direct, guide, etc.) the fluid.

The pressurized fluid flows in between a thrust disc, a forward thrust pad, and an aft thrust pad of the thrust bearing apparatus, system, and/or assembly. The thrust disc is coupled to the impeller shaft and protrudes radially outward from the impeller shaft, and the thrust pads are coupled to the pump housing(s) and protrude radially inward toward the impeller shaft. Furthermore, the pump can include expeller vanes to drive the fluid from internal portions of the pump housing to the pump outlet. In some examples, expeller vanes protrude from an aft side of the impeller and function similarly to impeller vanes. That is, fluid approaches the expeller vanes along the central axis and accelerates radially outward from the expeller vanes. Thus, the flowlines and the expeller vanes can implement a lubricating circuit from the pump outlet to the axial bearing(s) and back to the expeller vanes to provide a continuous flow of the fluid to the axial load bearings.

During operation of the pump, axial thrust of the impeller shaft can act in forward or aft directions based on interactions between the impeller vanes/expeller vanes and the fluid. The fluid enters through the pump inlet along a central/rotating/shaft axis toward the impeller, which includes the impeller vanes to accelerate the fluid radially outward into a pump outlet, chamber, flowline, casing, etc. Fluid pressure on a forward side, end, portion, face, etc., of the impeller can transfer aft axial loads to the impeller shaft in the aft direction.

Similarly, the fluid in the pump housing flows forward along the axis of rotation of the impeller shaft and builds up pressure on an aft side, end, portion, face, etc. of the impeller (e.g., the expeller). Fluid pressure on an aft side of the impeller can transfer forward loads to the impeller shaft in the forward direction.

When the forward and aft axial loads are of equal values and act in opposite directions, the pump is said to be "thrust balanced." As used herein, "forward thrust" refers to unbalanced thrust of the impeller shaft acting in the forward direction due to the forward axial load exceeding the aft axial load. As used herein, "aft thrust" refers to unbalanced thrust of the impeller shaft acting in the aft direction due to the aft axial load exceeding the forward axial load.

In some examples, when the pump operates at substantially low rotational speeds, angular velocities, operating speeds, etc. (e.g., 500, 1,000, 2,500 rpm, etc.), the fluid pressure at the pump inlet exceeds the fluid pressure within the pump housing(s). Thus, at substantially low operating speeds ("low speeds"), aft thrust of the impeller shaft is induced.

In some examples, when the pump operates at substantially high rotational speeds, angular velocities, operating speeds, etc. (e.g., 5000, 10,000, 25,000 revolutions per minute (rpm), etc.), the fluid pressure within the pump housing(s) exceeds the fluid pressure at the pump inlet. Thus, at substantially high operating speeds ("high speeds"), forward thrust of the impeller shaft is induced.

When forward thrust or aft thrust is applied to the impeller shaft, axial displacement (e.g., in forward or aft directions) of the impeller shaft from an initial position can occur by some amount (e.g., 0.001, 0.005, 0.010 inches (in), etc.) despite the axial support of the thrust bearing(s). At some operational speeds of the pump, the axial thrust acting on the impeller shaft can oscillate between forward and aft directions. At such speeds, the thrust can oscillate at frequencies that known thrust bearings are incapable of adaptively and/or dynamically supporting or cannot support quickly, efficiently, and/or adequately enough. Example thrust bearings that are unable to balance pressure may fail to keep appropriate spacing between thrust pads, spacers, thrust discs, etc. In such examples, damage to thrust pads, thrust discs, impeller shafts, or other pump components can result.

In examples disclosed herein, dynamic thrust bearing systems can adjust fluid pressures on forward and/or aft sides of the thrust disc to counteract the forward and/or aft thrust and inhibit, dampen, and/or restrict axial movement of the impeller shaft. In some examples, lubrication flowline(s) (e.g., primary flowline, secondary flowline(s), etc.) lead the fluid to the dynamic thrust bearing system (e.g., thrust pads and/or thrust disc) at an outer diameter of the dynamic thrust bearing system (e.g., traveling external to the pump housing(s)) and/or at points distal to a central axis of the dynamic thrust bearing system. In some examples, the lubrication flowline(s) direct the fluid to the dynamic thrust bearing system at an inner diameter of the dynamic thrust bearing system (e.g., internal to the pump housing(s)) and/or at points proximal to the central axis of the dynamic thrust bearing system. Rotation of the thrust disc in the dynamic thrust bearing system causes the fluid to pressurize between the thrust disc and the forward and aft thrust pads. In other words, the pressurized fluid, at least partially, bears the axial thrust of the impeller shaft.

In some examples, first and second secondary flowlines of the secondary lubrication flowline terminate at the forward and aft thrust pads, respectively, where magnet and/or spring assemblies can permit, inhibit, and/or prohibit the fluid from entering the dynamic thrust bearing system. For example, when the pump operates at low speeds, when aft thrust of the impeller shaft occurs, and/or when the impeller shaft moves in the aft direction, the fluid pressure on the aft side of the thrust disc can increase, cause an aft magnet and/or spring assembly to interact (e.g., engage), permit the fluid to enter a bearing chamber on the aft side of the thrust disc, further increase the aft fluid pressure, and inhibit, counteract, and/or stabilize aft movement of the thrust disc and/or impeller shaft.

In some other examples, the thrust pads and/or other parts of the dynamic thrust bearing system can divide the flow path of the primary flowline into separate internal channels of the thrust disc depending on a position of the impeller shaft and/or the thrust disc. For example, as the impeller shaft moves forward, forward internal passages become exposed, which direct the fluid to the forward side of the thrust disc, increase the forward fluid pressure, and inhibit, counteract, and/or stabilize forward movement of the thrust disc and/or impeller shaft.

Example magnetic thrust bearing systems disclosed herein reduce the amount of axial movement that the impeller shaft experiences due to forward and aft thrusts. Example magnetic thrust bearing systems disclosed herein can also dampen or otherwise reduce the frequency of oscillations in the impeller shaft due to unbalanced and alternating axial thrusts. Thus, examples disclosed herein can reduce a frequency or magnitude at which the impeller shaft or parts coupled thereto physically contact other part(s) and/or housing(s) of the pump. For example, examples disclosed herein employ magnets to prevent contact between (e.g., repel) an example thrust disc and example thrust pads. Additionally, examples disclosed herein employ magnets. Furthermore, example systems disclosed herein can improve the operational efficiency of the pump (e.g., centrifugal sCO2 pump) by minimizing or otherwise reducing frictional energy losses associated with axial impeller shaft movement. Furthermore, the example systems disclosed herein can increase the time between maintenance services to repair and/or replace component(s) of the thrust bearing(s), motor, pump, etc.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 can include a thermal management system 200 for transferring heat between fluids supporting the operation of the aircraft 10. More specifically, the aircraft 10 can include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the thermal management system 200 is configured to transfer heat between another fluid or component supporting the operation of the aircraft 10.

Although examples disclosed herein are described with reference to the aircraft 10 of FIG. 1, examples disclosed herein can be applicable to another type or configuration of aircraft that uses a thermal management system substantially similar to the thermal management system 200 of FIGS. 1-3. Thus, the present subject matter can be readily adaptable to another aircraft and/or another heat transfer application associated with another type of vehicle.

Figure 2:
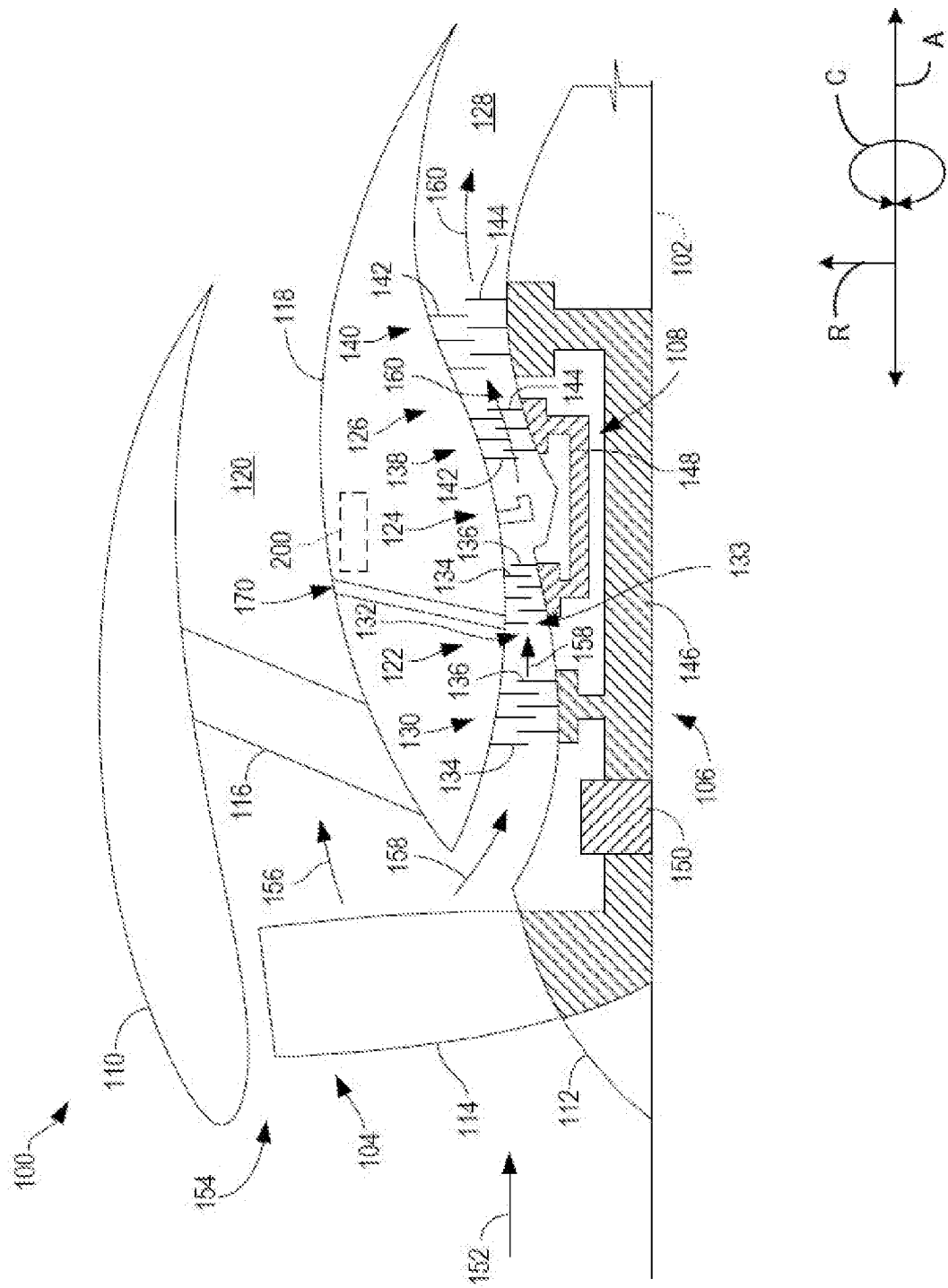
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128.

In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough.

Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes the low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 can include a thermal management system 200 for transferring heat between fluids supporting the operation of the aircraft 10. In this respect, the thermal management system 200 can be positioned within the engine 100. For example, as shown in FIG. 2, the thermal management system 200 is positioned within the outer casing 118 of the engine 100. However, in some other examples, the thermal management system 200 is positioned at another location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows compressed a portion of the second portion 158 of the air 152 from the compressor section 122 to bypass the combustion section 124. More specifically, in some examples, the third-stream flow path 170 defines a concentric or non-concentric passage relative to the compressed air flow path 133 downstream of one or more of the compressors 130, 132 or the fan 104. The third-stream flow path 170 can be configured to selectively remove the second portion 158 of the air 152 from the compressed air flow path 133 via one or more variable guide vanes, nozzles, or other actuatable flow control structures.

In addition, as will be described below, in some examples, the thermal management system 200 transfers heat to the air flowing through the third-stream flow path 170. However, a pressure and/or a flow rate of a fluid (e.g., a heat exchange fluid such as a supercritical fluid (e.g., supercritical carbon dioxide ($sCO_2$), etc.)) within the thermal management system 200 limits a rate at which thermal energy is transferred between the air and the heat exchange fluid. Additionally, it is advantageous for the thermal management system 200 to produce the pressure and/or the flow rate with pumps that support axial thrusts of the shaft within the pump to improve the lifespan and/or efficiency of the pump(s) and the thermal management system 200.

Although examples disclosed herein are described with reference to the gas turbine engine 100 of FIG. 2, examples disclosed herein can be applicable to another type or configuration of engine that uses a thermal management system substantially similar to the thermal management system 200 of FIGS. 1-3. Thus, the present subject matter can be readily adaptable to another engine and/or another heat transfer application associated with another type of vehicle.

Figure 3:
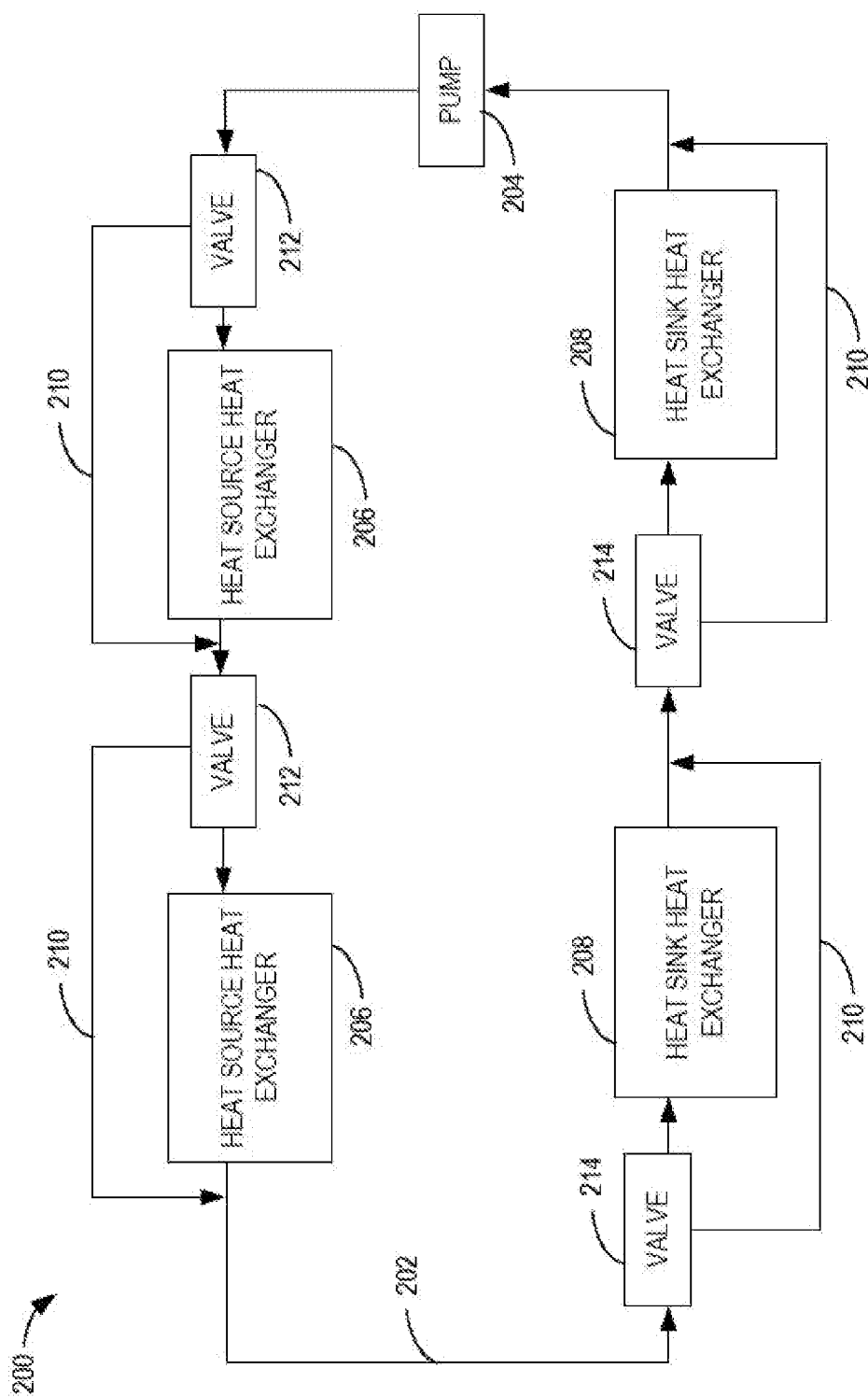
FIG. 3 is a schematic diagram of an example thermal management system for transferring heat between fluids.

FIG. 3 is a schematic view of an example implementation of the thermal management system 200 for transferring heat between fluids. In general, the thermal management system 200 is discussed in the context of the aircraft 10 and the gas turbine engine 100 described above and shown in FIGS. 1 and 2. However, the thermal management system 200 can be implemented within another type of aircraft and/or another gas turbine engine of another configuration.

As shown, the thermal management system 200 includes a thermal transport bus 202. Specifically, in some examples, the thermal transport bus 202 is configured as one or more fluid conduits through which a fluid (e.g., a heat exchange fluid) flows. As described below, the heat exchange fluid flows through various heat exchangers such that heat is added to and/or removed from the heat exchange fluid. In this respect, the heat exchange fluid can be a working fluid, such as supercritical carbon dioxide, oil, liquid helium, etc. Moreover, in such examples, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, which cools the fluids supporting the operation of the aircraft 10. Thus, the heat source heat exchanger(s) 206 adds heat to the heat exchange fluid. Although FIG. 3 illustrates two heat source heat exchangers 206, the thermal management system 200 can include a single heat source heat exchanger 206 or three or more heat source heat exchangers 206.

The heat source heat exchanger(s) 206 can correspond to many configurations of heat exchanger(s) that cool a fluid supporting the operation of the aircraft 10. In some examples, at least one of the heat exchangers 206 is a heat exchanger(s) of the lubrication system(s) of the engine(s) 100. In such examples, the heat exchanger(s) 206 transfers heat from the oil lubricating the engine(s) 100 to the heat transfer fluid. In some other examples, at least one of the heat exchangers 206 is a heat exchanger(s) of the cooling system of the engine(s) 100. In such examples, the heat exchanger(s) 206 transfers heat from the cooling air bled from the compressor section(s) 122 (or a compressor discharge plenum) of the engine(s) 100 to the heat transfer fluid. However, in some other examples, the heat source heat exchanger(s) 206 corresponds to other types of heat exchangers that cool a fluid supporting the operation of the aircraft 10.

Furthermore, the thermal management system 200 includes a plurality of heat sink heat exchangers 208 arranged along the thermal transport bus 202. More specifically, the heat sink heat exchangers 208 are fluidly coupled to the thermal transport bus 202 such that the heat exchange fluid flows through the heat sink heat exchangers 208. In this respect, the heat sink heat exchangers 208 are configured to transfer heat from the heat exchange fluid to other fluids supporting the operation of the aircraft 10, which heats the other fluids supporting the operation of the aircraft 10. Thus, the heat sink heat exchangers 208 remove heat from the heat exchange fluid. Although FIG. 3 illustrates two heat sink heat exchangers 208, the thermal management system 200 can include three or more heat sink heat exchangers 208.

The heat sink heat exchangers 208 can correspond to many configurations exchangers that heat a fluid supporting the operation of the aircraft 10. For example, at least of one of the heat exchangers 208 is a heat exchanger(s) of the fuel system(s) of the engine(s) 100. In such examples, the fuel system heat exchanger(s) 208 transfers heat from the heat transfer fluid to the fuel supplied to the engine(s) 100. In some other examples, at least one of the heat exchangers 208 is a heat exchanger(s) in contact with the first portion 156 of the air 152 flowing through the bypass airflow passage(s) 120 of the engine(s) 100. In such examples, the heat exchanger(s) 208 transfers heat from the heat exchange fluid to the first portion 156 of the air 152 flowing through the bypass airflow passage(s) 120.

In some examples, one or more of the heat exchangers 208 are configured to transfer heat to the air flowing through the third-stream flow path 170. In such examples, the heat exchanger(s) 208 is in contact with the air flow through the third-stream flow path 170. Thus, heat from the heat exchange fluid flowing through the thermal transport bus 202 can be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, which allows the heat exchanger(s) 208 to be smaller than heat exchangers relying on other heat sinks within the engine 100. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in some other examples, the heat sink heat exchangers 208 correspond to other types of heat exchangers that heat a fluid supporting the operation of the aircraft 10.

Moreover, in some examples, the thermal management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat exchangers 206, 208. In some examples, the heat exchange fluid bypasses one or more of the heat exchangers 206, 208 to adjust the temperature of the heat exchange fluid within the thermal transport bus 202. The flow of example heat exchange fluid through the bypass conduit(s) 210 is controlled to regulate the pressure of the heat exchange fluid within the thermal transport bus 202. In the illustrated example of FIG. 3, each heat exchanger 206, 208 has a corresponding bypass conduit 210. However, in some other examples, other numbers of heat exchangers 206, 208 can have a corresponding bypass conduit 210 as long as there is at least one bypass conduit 210.

Additionally, in some examples, the thermal management system 200 includes one or more heat source valves 212 and one or more heat sink valves 214. In general, each heat source valve 212 is configured to control the flow of the heat exchange fluid through a bypass conduit 210 that bypasses a heat source heat exchanger 206. Similarly, each heat sink valve 214 is configured to control the flow of the heat exchange fluid through a bypass conduit 210 that bypasses a heat sink heat exchanger 208. In this respect, each valve 212, 214 is fluidly coupled to the thermal transport bus 202 and a corresponding bypass conduit 210. As such, each valve 212, 214 can be moved between fully and/or partially opened and/or closed positions to selectively occlude the flow of heat exchange through its corresponding bypass conduit 210.

The valves 212, 214 are controlled based on the pressure of the heat exchange fluid within the thermal transport bus 202. More specifically, as indicated above, in certain instances, the pressure of the heat exchange fluid flowing through the thermal transport bus 202 can fall outside of a desired pressure range. When the pressure of the heat exchange fluid is too high, the thermal management system 200 can incur accelerated wear. In this respect, when the pressure of the heat exchange fluid within the thermal transport bus 202 exceeds a maximum or otherwise increased pressure value, one or more heat source valves 212 open. In such examples, at least a portion of the heat exchange fluid flows through the bypass conduits 210 instead of the heat source heat exchanger(s) 206. Thus, less heat is added to the heat exchange fluid by the heat source heat exchanger(s) 206, which reduces the temperature and, thus, the pressure of the fluid. In some examples, the maximum pressure value is between 3800 and 4000 pounds per square inch or less. In some examples, the maximum pressure value is between 2700 and 2900 pounds per square inch, such as 2800 pounds per square inch. In some other examples, the maximum pressure value is between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on one or more parameters (e.g., materials utilized, pump 204 design, aircraft 10 design, gas turbine engine 100 design, heat exchange fluid, etc.) associated with the thermal management system 200. The example maximum pressure value can be adjusted relative to the pressure capacities of the thermal transport bus 202, the pump 204, the heat exchangers 206, 208, the bypass conduit(s) 210, and/or the valves 212, 214.

Conversely, when the pressure of the heat exchange fluid is too low, the pump 204 can experience operability problems and increased wear. As such, when the pressure of the heat exchange fluid within the thermal transport bus falls below a minimum or otherwise reduced pressure value, one or more thermal sink valves 214 open. In such examples, at least a portion of the heat exchange fluid flows through the bypass conduits 210 instead of the heat sink heat exchangers 208. Thus, less heat is removed from the heat exchange fluid by the heat sink heat exchangers 208, which increases the temperature and, thus, the pressure of the fluid. In some examples, the minimum pressure value is 1070 pounds per square inch or more. In some examples, the minimum pressure value is between 1150 and 1350 pounds per square inch, such as 1250 pounds per square inch. In some other examples, the minimum pressure value is between 2400 and 2600 pounds per square inch, such as 2500 pounds per square inch. Such minimum pressure values are generally utilized when the heat exchange fluid in a supercritical state (e.g., when the heat exchange fluid is carbon dioxide).

As such, the thermal management system 200 can be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In some other examples, the range extends from 2500 to 2800 pounds per square inch.

Accordingly, the operation of the pump 204 and the valves 212, 214 allows the disclosed thermal management system 200 to maintain the pressure of the heat exchange fluid within the thermal transport bus 202 within a specified range of values as the thermal load placed on the thermal management system 200 varies.

Furthermore, the example pump 204 drives the flow of the heat exchange fluid through the thermal management system 200. In some examples, the thermal management system 200 includes one pump 204 or multiple pumps 204 depending on the desired flow rate, delta pressure across the pump 204, and/or the kinetic energy loss of the heat exchange fluid in the thermal transport bus 202. For example, the pump 204 can increase the output pressure head to accelerate the flow of the heat exchange fluid to a first flowrate. As the heat exchange fluid passes through the thermal transport bus 202, the example kinetic energy of the heat exchange fluid dissipates due to friction, temperature variations, etc. Due to the kinetic energy losses, the heat exchange fluid decelerates to a second flow rate at some point upstream of the pump 204. When the example second flow rate is below a desired operating flow rate of the heat exchange fluid, the pump 204 can either be of a different architecture that outputs a higher first flow rate, or one or more additional pumps 204 can be included in the thermal management system 200.

Figure 4:
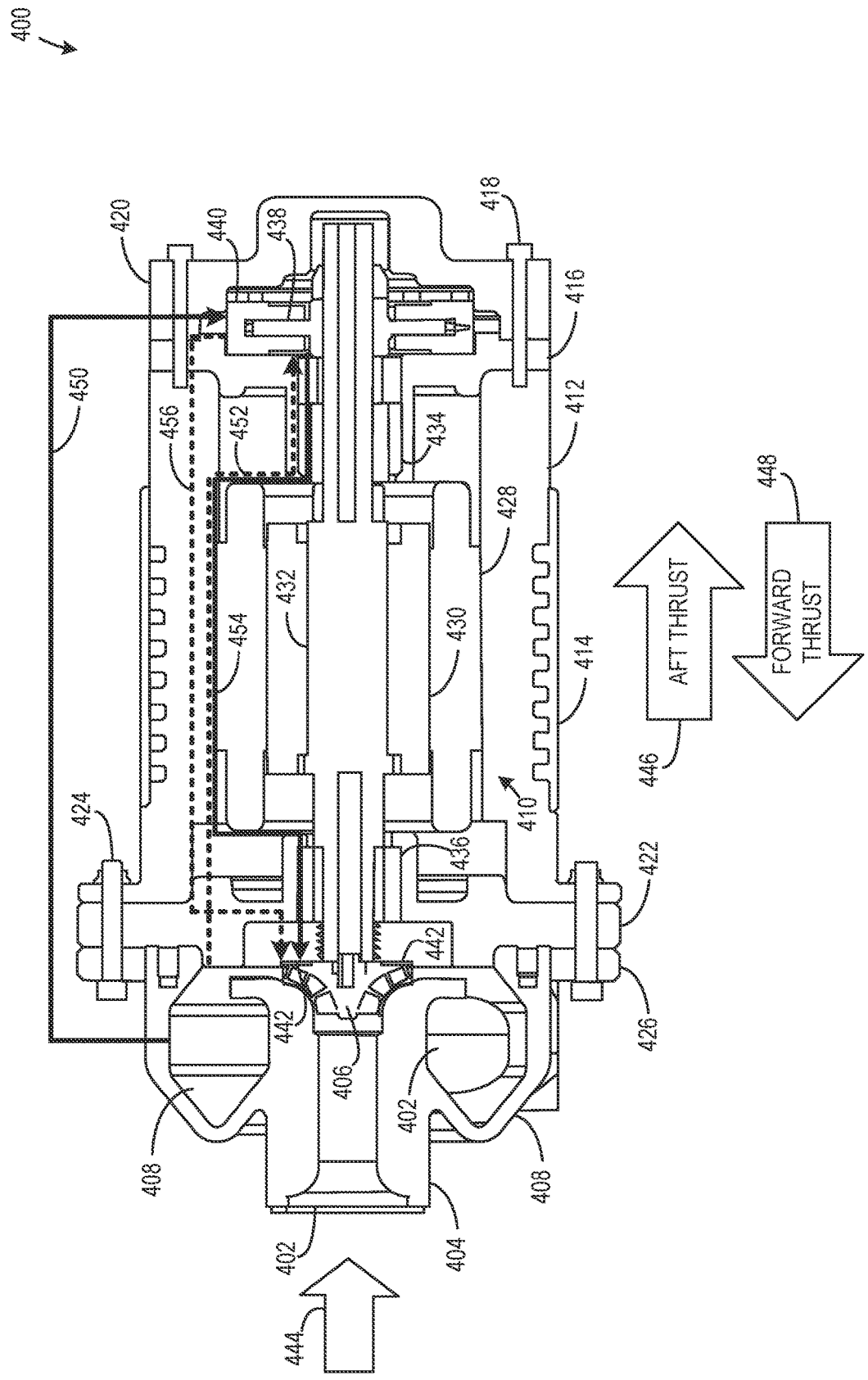
FIG. 4 is a schematic illustration of an example thermal transport bus pump.

FIG. 4 is a schematic illustration of an example thermal transport bus pump 400 (e.g., a supercritical carbon dioxide (sCO2) pump, the pump 204 of FIG. 3, etc.). In the illustrated example of FIG. 4, the thermal transport bus pump 400 drives a heat exchange fluid, such as supercritical carbon dioxide, through one or more fluid conduits (e.g., the thermal transport bus 202 of FIG. 3) 402. Specifically, the heat exchange fluid flows through an inlet pipe 404 and encounters an impeller 406 (e.g., a compressor wheel) that rotates to drive the heat exchange fluid through a pump outlet 408 fluidly coupled to the fluid conduit(s) 402. In turn, the fluid conduit(s) 402 can feed the heat exchange fluid to one or more heat exchangers (e.g., the heat exchanger 206, 208 of FIG. 3). Accordingly, the thermal transport bus pump 400 can pump the heat exchange fluid to manage a thermal energy of working fluids associated with the aircraft 10 of FIG. 1 and/or the gas turbine engine 100 of FIG. 2.

In the illustrated example of FIG. 4, the thermal transport bus pump 400 includes a motor 410 positioned in a motor housing 412. In FIG. 4, the motor 410 is an induction motor operatively coupled to a variable frequency drive (VFD) and controlling circuitry (not shown), such as a full authority digital engine control (FADEC), that controls a rotational speed of the motor 410. For example, the controlling circuitry can operate the motor 410 based on a pressure and/or a temperature of the heat exchange fluid in the fluid conduit (s) 402 and/or in the thermal transport bus pump 400. In some examples, the controlling circuitry can operate the motor 410 based on a pressure and/or a temperature of the working fluids affected by the heat exchange fluid. Additionally or alternatively, the controlling circuitry can operate the motor 410 based on vibration measurements obtained by accelerometers operatively coupled to the thermal transport bus pump 400 and/or the fluid conduit(s) 402.

In FIG. 4, the motor housing 412 is at least partially surrounded by a cooling jacket 414 to prevent the motor 410 from overheating. An aft end of the motor housing 412 is coupled to an aft bearing housing 416 via first bolts 418. Furthermore, an end cap 420 is coupled to the aft bearing housing 416 via the first bolts 418. A forward end of the motor housing 412 is coupled to a forward bearing housing 422 opposite the aft bearing housing 416 via second bolts 424. Moreover, the forward bearing housing 422 is coupled to a backplate 426 and the pump outlet 408 on an opposite side of the backplate 426 via the second bolts 424.

In the illustrated example of FIG. 4, the motor 410 includes a stator 428 to induce alternating electrical currents in field coils and emit alternating magnetic fields about a central axis of the motor 410. The alternating magnetic fields interact with permanent magnets of a rotor 430 and, in turn, provide torque to the rotor 430. The rotor 430 is fixedly coupled to an impeller shaft 432 ("shaft 432"), and the shaft is fixedly coupled to the impeller 406. As such, the motor 410 drives a rotation of the shaft 432 and, in turn, a rotation of the impeller 406. An aft end of the shaft 432 is supported by a first radial foil bearing 434, which is coupled to the aft bearing housing 416. Similarly, a forward end of the shaft 432 is supported by a second radial bearing 436 coupled to the forward bearing housing 422.

The first radial foil bearing 434 and the second radial bearing 436 include spring-loaded foil journal linings that support radial loads of the shaft 432 during substantially low (e.g., startup) rotational speeds (e.g., 0-5,000 rotations per minute (rpm), etc.). When the motor 410 causes the shaft 432 to rotate at a substantially high (e.g., operational) rotational speed (e.g., 5000-20,000 rpm, etc.), a pressure of the working medium (e.g., air, oil, supercritical carbon dioxide (sCO2), etc.) increases and pushes the foil lining radially outward. Thus, the pressurized working medium supports the radial loads of the shaft 432 when the shaft 432 is rotating at operational speeds (e.g., 3000 rpm, 10,000 rpm, 25,000 rpm, etc.).

In the illustrated example of FIG. 4, a thrust disc 438 of the shaft 432 is supported by a thrust bearing system 440. For example, the thrust bearing system 440 can include foil bearings to support axial loads of the shaft 432 via interactions with the thrust disc 438. In some examples, the thrust bearing system 440 is coupled to the aft bearing housing 416 and/or the end cap 420 via bolts.

The example impeller 406 of the pump 400 includes expeller vanes 442 on an aft portion of the impeller 406. At operational speeds of the motor 410, the expeller vanes 442 cause the working fluid (e.g., sCO2) to flow forward from the forward bearing housing 422, motor housing 412, etc. into the fluid conduit 402.

In the illustrated example of FIG. 4, the example sCO2 fluid flows into the pump 400 by way of the fluid conduit 402 as illustrated with an arrow indicating a flow direction 444. At low speeds (e.g., startup speeds) of the motor 410, the flow direction 444 of the example sCO2 imparts an aft thrust 446 on the impeller 406 and the shaft 432 as illustrated with an arrow indicating a direction of the aft thrust 446. At high speeds (e.g., operational speeds) of the motor 410, the expeller vanes 442 drive the heat exchange fluid inside the pump 400 forward toward the pump outlet 408, and the fluid generates a forward thrust 448 on the impeller 406 and the shaft 432 as illustrated with an arrow indicating a direction of the forward thrust 448. The thrust bearing system 440 is included in the pump 400 to support the aft and forward thrusts 446, 448 of the shaft 432.

In some examples, the pump 400 includes an example outer flowline 450 that diverges from the pump outlet 408 to provide sCO2 as a working medium to the thrust bearing system 440 and to support the thrust disc 438 when pressurized. Additionally or alternatively, the outer flowline 450 diverges from the fluid conduit 402 and/or the expeller vanes 442. The example outer flowline 450 can circumvent one or more of the motor housing 412, the aft bearing housing 416, the forward bearing housing 422, and/or the backplate 426 to access the thrust bearing system 440.

In some examples, the pump 400 includes an example inner flowline 452 that diverges from the expeller vanes 442 to provide sCO2 as a working medium to the thrust bearing system 440 and to support the thrust disc 438 when pressurized. Additionally or alternatively, the inner flowline 452 diverges from the fluid conduit 402 and/or the pump outlet 408. The example inner channel can pass through one or more of the motor housing 412, the aft bearing housing 416, the forward bearing housing 422, and/or the backplate 426 to access the thrust bearing system 440.

The outer and inner flowlines 450, 452 of FIG. 4 are illustrated as example configurations to reflect general locations of the flowlines and directions of the flow. Although both the outer and inner flowlines 450, 452 are illustrated in FIG. 4, only one may be included in the pump 400 to achieve a same function. The pump 400 can be configured with the outer flowline 450 to reduce complication during fabrication and/or assembly and to reduce risk of internal leakages. The pump 400 can be configured with the inner flowline 452 to reduce an amount of space the pump 400 occupies.

Also illustrated in FIG. 4 are first return flowline(s) 454 and second return flowline(s) 456 to generally depict exit points and flow directions of the working fluid from the thrust bearing system 440 to the expeller vanes 442. Further details of the outer flowline 450, the inner flowline 452, the first return flowline 454, and the second return flowline 456 are described below with reference to FIG. 5.

In the illustrated example of FIG. 4, the thrust disc 438 and the thrust bearing system 440 are designed such that forward and aft bearing capacities are not dynamically adjusted to account for fluctuations between aft and forward thrusts 446, 448. In other words, there may be no dynamic subsystems in the thrust bearing system 440 to dynamically change axial support a forward or an aft side of the thrust disc 438 in response transition(s) from the aft thrust 446 to the forward thrust 448 and vice versa. Examples disclosed herein include apparatus and systems to dynamically support axial loads in forward and/or aft directions (e.g., aft and/or forward thrusts 446, 448) based on a fluid pressure changes on forward and aft sides of a thrust disc.

Figure 5:
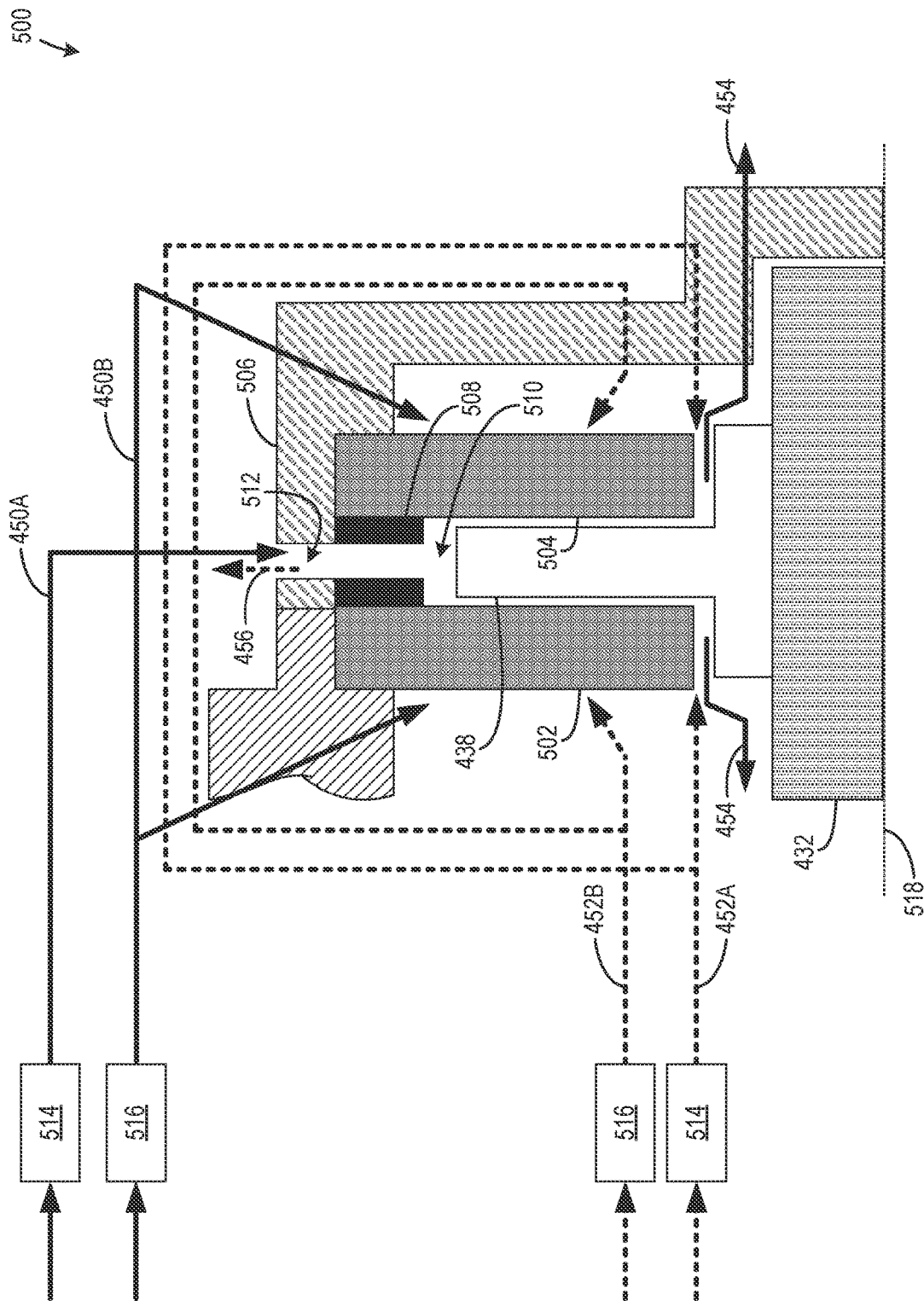
FIG. 5 is a schematic illustration of an example thrust bearing system.

FIG. 5 is a schematic illustration of a thrust bearing system 500 that can be used in the pump 400 illustrated in FIG. 4. The thrust bearing system 500 includes the thrust disc 438 fixedly coupled to the impeller shaft 432 and interposed between a forward thrust pad 502 and an aft thrust pad 504. The thrust bearing system 500 includes a thrust bearing housing 506 to rigidly affix the forward and aft thrust pads 502, 504 in place. The forward and aft thrust pads 502, 504 are spaced at a distance by a spacer 508 to define a bearing chamber 510 where the fluid can collect and become pressurized by the rotating thrust disc 438. The thrust bearing housing 506 includes an opening 512 (e.g., a hole, slot, port, etc.) to permit the fluid to enter the bearing chamber 510, become pressurized on forward and aft sides of the thrust disc 438, and bear axial loads of the shaft 432. In some examples, the thrust bearing system 500 and example systems disclosed herein include a magnet and/or spring assembly in the bearing chamber 510 between the thrust disc 438 and the forward and aft thrust pads 502, 504 to support axial loads of the shaft 432 during startup operations of the pump 400 before the pressurized working fluid solely supports the thrust disc 438.

The illustration of FIG. 5 depicts a primary outer flowline 450A to provide the working fluid (e.g., sCO2) to the thrust disc 438 via the opening 512 (distal to a central axis 518 of the shaft 432). The example thrust bearing system 500 also includes a secondary outer flowline 450B to illustrate how the fluid is provided to the forward and/or aft thrust pads 502, 504. As mentioned previously, the outer flowlines 450A-B can circumvent the exterior of the pump 400 around one or more of the motor housing 412, the aft bearing housing 416, the end cap 420, and/or the forward bearing housing 422. In some examples, the outer flowlines 450A-B exit the pump 400 at the pump outlet 408 and re-enter at the aft bearing housing 416 and/or the end cap 420. Although one primary outer flowline 450A and one secondary outer flowline 450B are illustrated in FIG. 5, the thrust bearing system 500 can include a plurality of (e.g., two, four, ten, etc.) primary and secondary outer flowlines 450A-B. In general, the number of primary outer flowlines 450A corresponds to the number of secondary flowlines 450B. However, in some examples, the inequal numbers of primary and second flowlines 450A-B are utilized.

When the outer flowlines 450A-B are included, the thrust bearing system 500 can also include the first return flowline(s) 454 to transmit the working fluid back to the expeller vanes 442. The first return flowline(s) 454 exit the bearing chamber 510 proximal to the central axis 518 of the shaft 432. Although two of the first return flowlines 454 are illustrated in FIG. 5, there can be a plurality (e.g., four, eight, 12, etc.) of first return flowlines 454 included in the thrust bearing system 500. Generally, when the outer flowlines 450A-B are utilized, the thrust bearing system 500 includes at least one of the first return flowline(s) 454 on the forward side of the thrust disc 438 and at least one of the first return flowline(s) 454 on the aft side of the thrust disc 438. In some examples, the first return flowlines 454 illustrated in FIG. 5 originate as distinct flowlines that converge at some point downstream of the thrust bearing system 500 and upstream of the expeller vanes 442. In some examples, the first return flowlines 454 remain distinct and separated between the thrust bearing system 500 and the expeller vanes 442.

The illustration of FIG. 5 also depicts a primary inner flowline 452A to provide the fluid to the thrust disc 438 via gaps and/or openings proximal to the central axis 518 of the shaft 432. Furthermore, the example thrust bearing system 500 also includes a secondary inner flowline 452B to illustrate how the fluid is provided to the forward and/or aft thrust pads 502, 504. As mentioned previously, the inner flowlines 452A-B can pass through the interior of the pump 400 through and/or between one or more of the motor 410, the motor housing 412, the aft bearing housing 416, the end cap 420, and/or the forward bearing housing 422. Although one primary inner flowline 452A and one secondary inner flowline 452B are illustrated in FIG. 5, the thrust bearing system 500 can include a plurality of (e.g., two, four, ten, etc.) primary and secondary inner flowlines 452A-B. In general, the number of primary inner flowlines 452A corresponds to the number of secondary inner flowlines 452B. However, in some examples, the inequal numbers of primary and secondary inner flowlines 452A-B are utilized.

When the inner flowlines 452A-B are included, the thrust bearing system 500 can also include the second return flowline(s) 456 to transmit the working fluid back to the expeller vanes 442. The second return flowline(s) 456 exit the bearing chamber 510 distal to the central axis 518 of the shaft 432 via the opening 512. Although one of the second return flowline(s) 456 is illustrated in FIG. 5, there can be a plurality (e.g., two, four, 12, etc.) of second return flowlines 456 included in the thrust bearing system 500. Generally, when the inner flowlines 452A-B are utilized, the thrust bearing system 500 includes at least one of the second return flowline(s) 456 at respective openings 512 disposed on the spacer 508 circumferentially distributed about the central axis 518.

It should be appreciated that the secondary outer and inner flowlines 450B, 452B are included in FIG. 5 merely to illustrate possible configurations of examples disclosed herein and do not contribute to the functionality of the thrust bearing system 500. Furthermore, as mentioned below, the secondary inner or outer flowlines 450B, 452B are applicable to example dynamic thrust bearing systems illustrated in and described in reference to FIG. 5 but not to those illustrated in and described in reference to FIGS. 6-11.

The example illustration of FIG. 5 includes a primary heat exchanger 514 and a secondary heat exchanger 516 to adjust mass flowrates in the primary and secondary outer flowlines 450A, 450B, respectively. In some examples, the primary and secondary heat exchangers 514, 516 are included to adjust mass flowrates in the primary and secondary inner flowlines 452A, 452B. In some examples, only the second heat exchanger 516 is included without the primary heat exchanger 514 to adjust a mass flowrate of fluid to the forward and aft thrust pads 502, 504. The primary and secondary heat exchangers 514, 516 can be heat source heat exchangers that transfer heat from another component of the example aircraft 10 or the thermal management system 200 to the fluid. In some examples, increasing the temperature of the flowing fluid (e.g., sCO2) also increases the pressure of the fluid, and, in turn, increases the mass flowrate of the fluid. In some examples, the primary and secondary heat exchangers 514, 516 can be heat sink heat exchanges that transfer heat from the fluid to another component of the example aircraft 10 or the thermal management system 200.

Although both the outer flowlines 450A-B and the inner flowlines 452A-B are illustrated in FIG. 5, the pump 400, the thrust bearing system 500, and/or example dynamic thrust bearing systems disclosed herein can function with either the outer flowlines 450A-B or the inner flowlines 452A-B without including the other. Both the outer flowlines 450A-B, and inner flowlines 452A-B are illustrated in FIG. 5 to show that outer or inner configurations are possible in examples disclosed herein. Although the example dynamic thrust bearing systems described below are illustrated and referenced as being used with the outer flowline 450A, alternative examples of the dynamic thrust bearing systems can be used with one or more of the inner flowlines 452A-B or the outer flow lines 450A-B.

Figure 6:
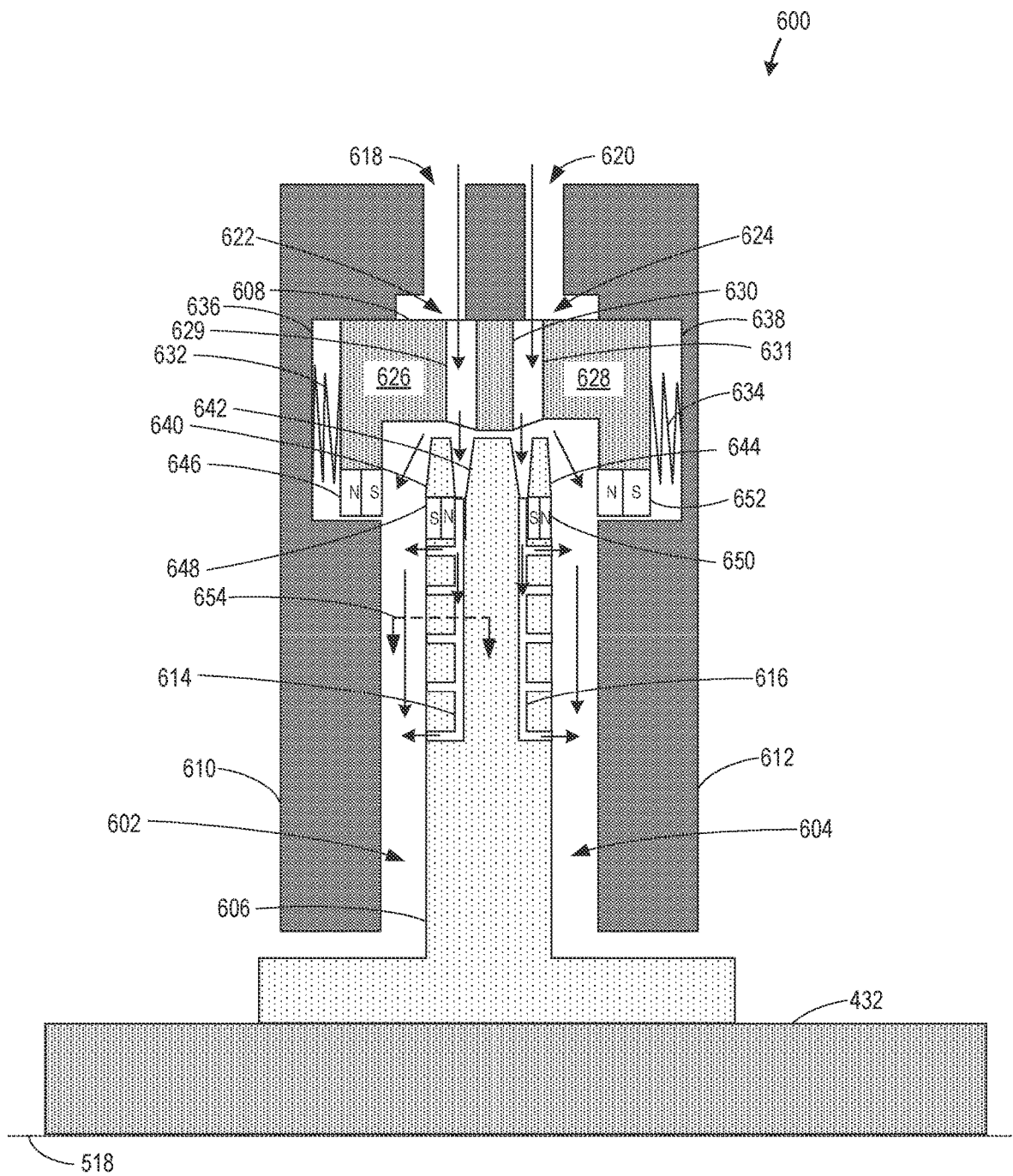
FIG. 6 is a schematic illustration of an example first dynamic thrust bearing system in accordance with the teachings disclosed herein.

As mentioned above, example thrust bearing systems mentioned in connection with FIGS. 6-11 facilitate (e.g., guide) the working fluid through flowlines 450B, 452B. FIG. 6 is a schematic illustration of an example first dynamic thrust bearing system 600 to direct the flow of the working fluid (e.g., sCO2) to a forward side 602 or an aft side 604 of a thrust disc 606 based on a position of the thrust disc 606 and/or an example sleeve 608. The example thrust disc 606 is coupled to the shaft 432. The system 600 includes a forward thrust pad 610 and an aft thrust pad 612 to support axial thrust transferred from the shaft 432 via the thrust disc 606. The example thrust disc 606 of the first system 600 includes a forward channel 614 and an aft channel 616 that can direct flow of the fluid to the forward side 602 and/or the aft side 604 in response to displacement of the shaft 432 and the thrust disc 606. The forward channel 614 includes outlets for directing flow to the forward side 602 and the aft channel 616 includes outlets for directing flow to the aft side 604. The example channels 614, 616 are axially spaced in the thrust disc 606.

In the example of FIG. 6, the system 600 includes an example forward opening 618 and an example aft opening 620. The example forward opening 618 permits fluid to enter a bearing chamber 622, become pressurized on the forward side 602, and at least partially bear axial loads of the shaft 432. Further, the example aft opening 620 permits fluid to enter a bearing chamber 624, become pressurized on the aft side 604, and at least partially bear axial loads of the shaft 432.

The example sleeve 608 includes a forward sleeve portion 626 corresponding to the forward opening 618 and an aft sleeve portion 628 corresponding to the aft opening 620. The example sleeve 608 includes a central sleeve portion 630 positioned between the forward sleeve portion 626 and the aft sleeve portion 628. In this example, the sleeve 608 includes example apertures 629, 631 to permit fluid flow therethrough, the apertures 629, 631 extending through opposing surfaces of the sleeve 608.

The example system 600 includes an example spring 632 positioned between the forward sleeve portion 626 and the forward thrust pad 610 and an example spring 634 positioned between the aft sleeve portion 628 and the aft thrust pad 612. In FIG. 6, the forward thrust pad 610 includes a cavity 636 positioned in a surface of the forward thrust pad 610 that faces the thrust disc 606. Further, the aft thrust pad 612 includes a cavity 638 positioned in a surface of the aft thrust pad 612 that faces the thrust disc 606. Accordingly, the spring 632 extends from an inner wall of the cavity 636 to the forward sleeve portion 626. Further, the spring 634 extends from an inner wall of the cavity 638 to the aft sleeve portion 628. The example springs 632, 634 can generate spring forces on the sleeve 608 to counteract (e.g., react to) forces generated by the fluid pressure forward of the thrust disc 606, fluid pressure aft of the thrust disc 606, and/or axial displacement of the thrust disc 606. In some examples, the stiffness (e.g., spring force) of the springs 632, 634 is at least partially based on material(s) (e.g., low-alloy steel, cold formed steel, etc.) and/or a number of coils of the springs 632, 634.

The example thrust disc 606 of the system 600 includes branches (e.g., walls, protrusions, sides of the thrust disc 606, etc.) 640, 642, 644 that are positioned on a surface (e.g., a circumferential surface) of the thrust disc 606 and protrude radially outward relative to the central axis 518 of the shaft 432. In some examples, walls 640, 642, 644 extend from a surface of the thrust disc 606 and are defined by the channels 614, 616 extending through the thrust disc. The branch 640 is facing the forward thrust pad 610, the branch 644 is facing the aft thrust pad 612, and the branch 642 is positioned between the branch 640 and the branch 644. The example branches 640, 642, 644 can direct (e.g., guide, obstruct, inhibit, etc.) flow received through the openings 618, 620 to the forward side 602 or the aft side 604. In some examples, at least one of the branches 640, 642, 644 can direct flow from the openings 618, 620 through the channels 614, 616 to the forward side 602 or the aft side 604. For example, the forward channel 614 is positioned between the branches 640, 642 to guide flow from the forward opening 618 and the aft channel 616 is positioned between the branches 642, 644 to guide flow from the aft opening 620. In some examples, the branches 640, 642, 644 are bodies (e.g., structures) added to a surface of the thrust disc 606. In other examples, the branches 640, 642, 644 are walls of the thrust disc 606 defined by the channels 614, 616.

The example system 600 includes example magnets 646, 648, 650, 652 that repel (e.g., interact with) each other to balance pressure in the system 600, maintain positioning of the thrust disc 606 and/or the sleeve 608, and/or at least partially counteract axial thrust in the system 600.

For example, the magnets 648, 650 can be embedded in and/or surrounding the branches 640, 644 and/or the sides 602, 604 of the thrust disc 606. In some examples, the magnets 648, 650 are shaped (e.g., arc shaped, ring shaped, etc.) to surround (e.g., encircle) the branches 640, 644. Further, the magnets 646, 652 can be embedded in the sleeve 608. In some examples, the magnets 646, 652 are positioned adjacent to the thrust pads 610, 612.

In the example of FIG. 6, the north poles of the magnets 650, 652 are facing each other and the south poles of the magnets 646, 648 are facing each other. Accordingly, the magnet 648 can repel (e.g., interact with) the magnet 646 embedded in the forward sleeve portion 626. Additionally, the magnet 650 can repel the magnet 652 embedded in the aft sleeve portion 628.

In some examples, the system 600 includes the magnets 646, 648, 652. In such examples, the magnet 648 is associated with (e.g., encircles, surrounds, embedded in, etc.) at least one of the branches 640, 642, 644. Further, the magnet 648 can repel at least one of the magnets 646, 652.

In some examples, the repelling force of the magnets 646, 648, 650, 652 can cause the thrust disc 606 to move. In some examples, the force interactions between the magnets 646, 648, 650, 652 and the compressible springs 632, 634 can prevent the thrust disc 606 from contacting the thrust pads 610, 612, described in detail below in connection with FIGS. 7-9.

In some examples, diameters of the magnets 646, 648, 650, 652 can be 0.045 inches (in). In other examples, diameters of the magnets 646, 648, 650, 652, can be a percentage (e.g., 35%) of a thickness of the thrust disc 606. Further, the example magnets 646, 648, 650, 652 can include a thickness of 0.045 in, a width of 0.045 in, a circumferential width of 0.5 in, etc. In some examples, each of the example magnets 646, 648, 650, 652 can withstand a force of 70 pounds (lbs.) (e.g., 300 N, 35 kilo revolutions per minute (KRPM), etc.). Additionally or alternatively, repelling force(s) of the example magnets 646, 648, 650, 652 may be determined based on known thrust variations (e.g., 10-50 lbs. in foil bearings).

FIGS. 7, 8, 9A, and 9B are schematic views of the first system 600 including a first cross-sectional view 700, a second cross-sectional view 800, a third cross-sectional view 900, and a side view 902. The first cross-sectional view 700 illustrates a forward displacement of the thrust disc 606 and the sleeve 608 in the bearing chamber 622 due to the forward thrust 448 of the shaft 432. When the thrust disc 606 is in a central position (shown in FIG. 6), the branch 642 and/or the central sleeve portion 630 obstructs the fluid such that the fluid diverts to the forward side 602 and the aft side 604 of the thrust disc 606 (e.g., via the forward channel 614 and the aft channel 616) substantially equally (e.g., within +/−1 kilogram per second (kg/s)). In other words, the openings 618, 620, the apertures 629, 631, and the channels 614, 616 are aligned.

Figure 7:
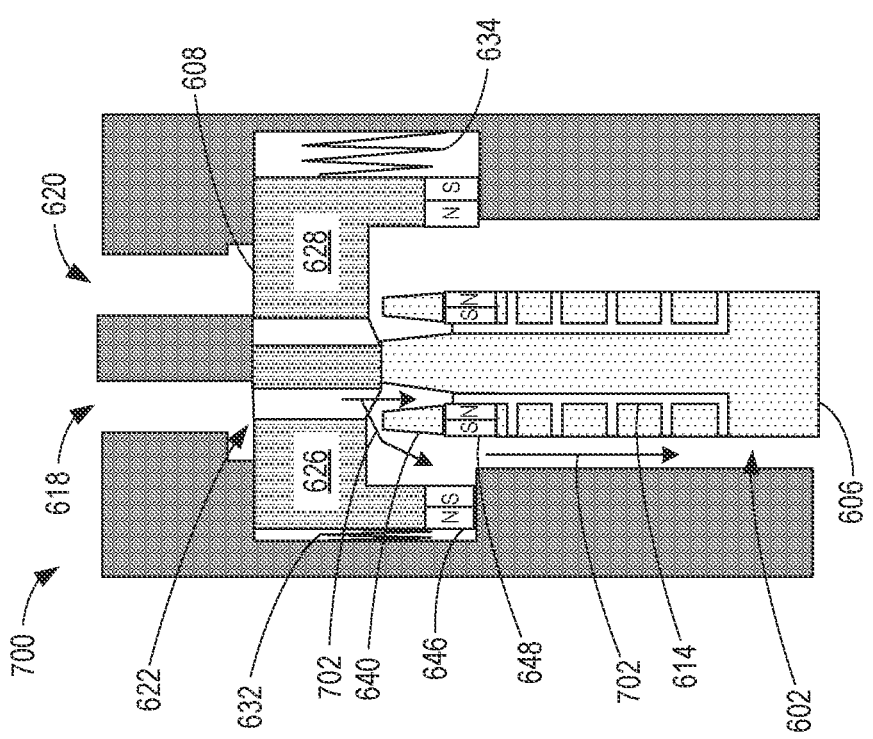
FIG. 7 is a partial view of the example first dynamic thrust bearing system in accordance with the teachings disclosed herein.

As illustrated in FIG. 7, when the sleeve 608 moves forward in the bearing chamber 622, the aft sleeve portion 628 obstructs and/or inhibits flow through the aft opening 620. Example arrows 702 illustrate the flow direction of the fluid when the thrust disc 606 and the sleeve 608 are in the forward position. As the fluid flows through the forward opening 618 into the forward channel 614, the fluid flows to the forward side 602 of the thrust disc 606, increases the fluid pressure in the bearing chamber 622 at the forward side 602, and causes the thrust disc 606 to return to the central position of FIG. 6. In particular, the fluid can flow aft of the branch 640 (via the channel 614) and/or forward of the branch 640 (to the forward side 602).

Additionally or alternatively, when the sleeve 608 moves forward in the bearing chamber 622, the spring 632 compresses and causes the sleeve 608 to return to the central position of FIG. 6. In some examples, the spring 632 compresses when fluid flows to the forward side 602 of the thrust disc 606. In some examples, the spring 634 tenses when the sleeve 608 and/or the thrust disc 606 is in the forward position. Accordingly, the spring 634 can tense and cause the sleeve 608 to return to the central position of FIG. 6.

Further, when the sleeve 608 and the thrust disc 606 move forward in the bearing chamber 622, the magnets 646, 648 move closer to one another. Accordingly, the magnetic repulsion of the magnets 646, 648 increases as the distance between the magnets 646, 648 (e.g., between like poles of the magnets 646, 648) decreases. Thus, the forward sleeve portion 626 and the thrust disc 606 can push away from each other due to the interaction between the magnetic fields of their respective embedded magnets 646, 648. In the example of FIG. 7, the sleeve 608 and/or the thrust disc 606 can return to the central position of FIG. 6 due to at least one of the increase in fluid pressure at the forward side 602, the compression of the spring 632, the tension in the spring 634, or the magnetic repulsion of the magnets 646, 648.

Figure 8:
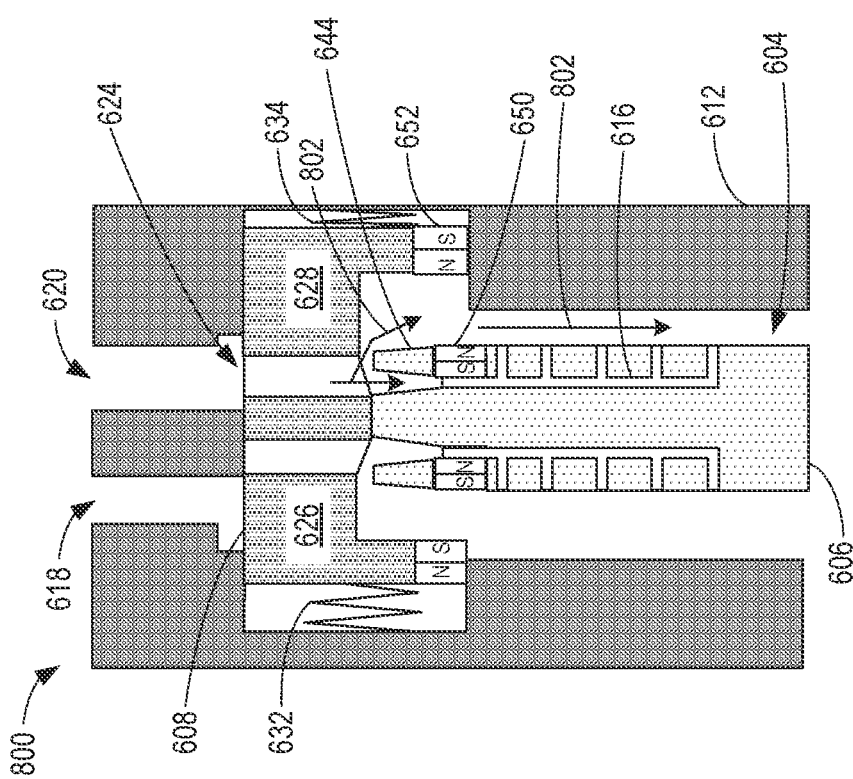
FIG. 8 is another partial view of the example first dynamic thrust bearing system in accordance with the teachings disclosed herein.

The second cross-sectional view 800 illustrates an aft displacement of the thrust disc 606 and the sleeve 608 in the bearing chamber 624 due to the aft thrust 446 of the shaft 432. As illustrated in FIG. 8, when the sleeve 608 moves aft in the bearing chamber 624, the forward sleeve portion 626 obstructs and/or inhibits flow through the forward opening 618. Example arrows 802 illustrate the flow direction of the fluid when the thrust disc 606 and/or the sleeve 608 is in the aft position. As the fluid flows into the aft channel 616 (e.g., via the opening 620), the fluid flows to the aft side 604 of the thrust disc 606, increases the fluid pressure in the bearing chamber 624 at the aft side 604, and causes the thrust disc 606 to return to the central position of FIG. 6. In particular, the fluid can flow forward of the branch 644 (via the channel 616) and/or aft of the branch 644 (to the aft side 604).

Additionally or alternatively, when the sleeve 608 moves aft in the bearing chamber 624, the spring 634 compresses and causes the sleeve 608 to return to the central position of FIG. 6. In some examples, the spring 634 compresses when fluid flows to the aft side 604 of the thrust disc 606. In some examples, the spring 632 tenses when the sleeve 608 and/or the thrust disc 606 is in the aft position. Accordingly, the spring 632 can tense and cause the sleeve 608 to return to the central position of FIG. 6.

Further, when the sleeve 608 and/or the thrust disc move aft in the bearing chamber 624, the magnets 650, 652 move closer to one another. Accordingly, the magnetic repulsion of the magnets 650, 652 increases as the distance between the magnets 650, 652 (e.g., between like poles of the magnets 650, 652) decreases. Thus, the aft sleeve portion 628 and the thrust disc 606 will push away from each other due to the interaction between the magnetic fields of their respective embedded magnets 650, 652. In the example of FIG. 8, the sleeve 608 and/or the thrust disc 606 can return to the central position of FIG. 6 due to at least one of the increase in fluid pressure at the aft side 604, the compression of the spring 634, the tension in the spring 632, or the magnetic repulsion of the magnets 650, 652.

The third cross-sectional view 900 shows a cross-section of a portion of the forward side 602 of the thrust disc 606. The illustrated example of FIG. 9A shows the portion of the thrust disc 606 that has been bisected along a reference line 654 of FIG. 6. As shown in FIG. 9A, the thrust disc 606 can include multiple forward channels 614 distributed in a circumferential (e.g., arc shaped) pattern on the forward side 602 of the thrust disc 606. In some examples, another portion of the thrust disc 606 on the aft side 604 can include multiple aft channels 616 distributed in a circumferential pattern in the thrust disc 606.

The side view 902 shows a side of a portion of the thrust disc 606 from a forward perspective. The illustrated example of FIG. 9B shows the forward side 602 of the thrust disc 606 having outlets of the channel 614 distributed along the thrust disc 606 (e.g., a longitudinal axis of the thrust disc 606). In other examples, the aft side 604 of the thrust disc 606 includes outlets of the channel 616 distributed along the thrust disc 606.

Thus, the system 600 includes the thrust disc 606 with the forward channels 614, the aft channels 616, the sleeve 608, the springs 632, 634, the magnets 646, 648, 650, 652, and the branches 640, 642, 644 to be self-stabilizing and to dynamically adjust the position of the thrust disc 606 and the shaft 432 in response to unbalanced forward and aft thrusts.

Figure 10:
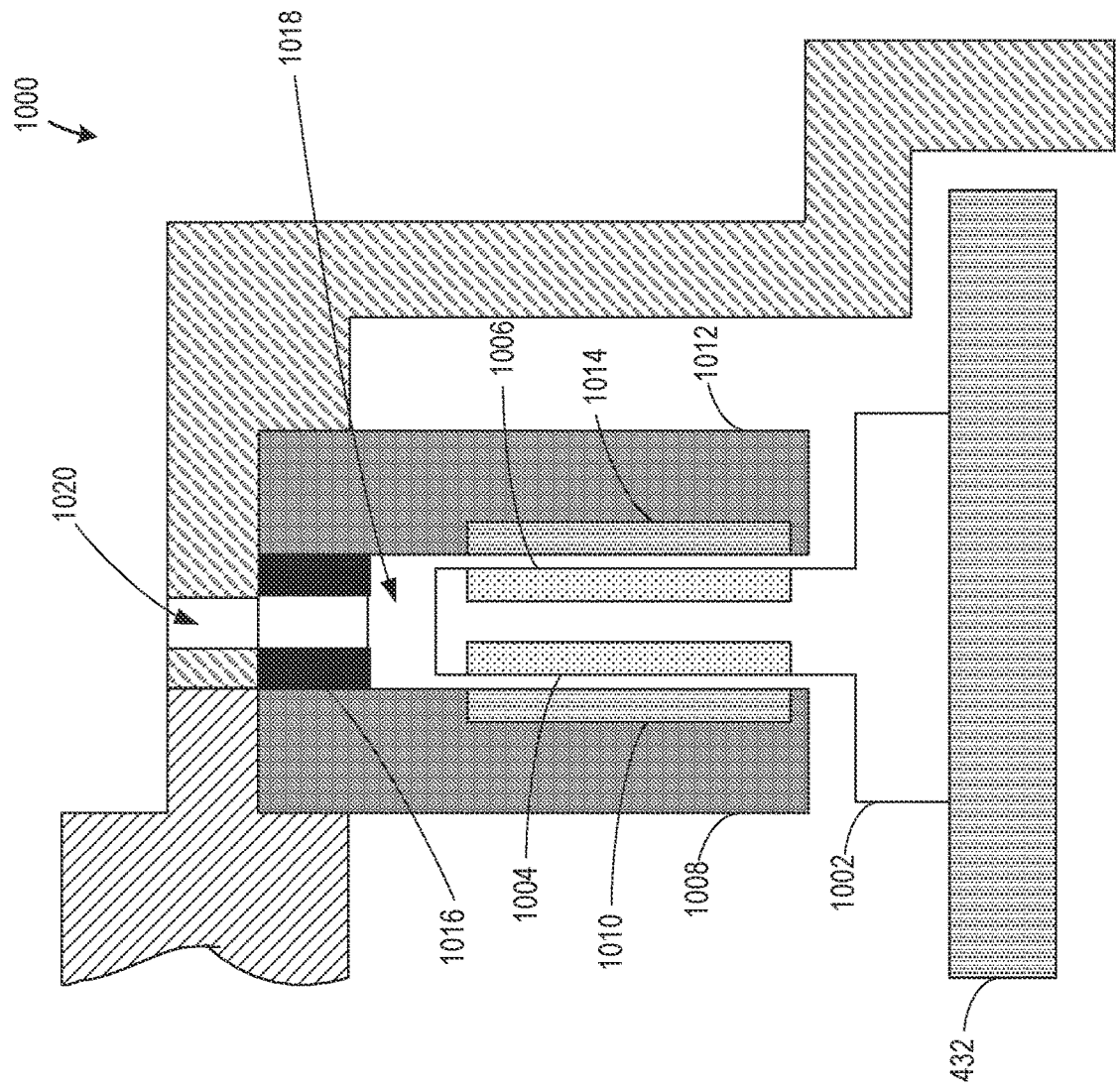
FIG. 10 is a schematic illustration of an example second dynamic thrust bearing system in accordance with the teachings disclosed herein.

FIG. 10 is a schematic illustration of an example second dynamic thrust bearing system 1000 including an example thrust disc 1002 including magnets 1004, 1006, an example forward thrust pad 1008 including an example magnet 1010, and an example aft thrust pad 1012 including an example magnet 1014. The example magnets 1004, 1006, 1010, 1014 can be an example magnet assembly. The example magnet 1010 is embedded in and/or adjacent to a surface of the forward thrust pad 1008. For example, the magnet 1010 can extend along a surface of the forward thrust pad 1008. In this example, the magnet 1010 is embedded in a surface of the forward thrust pad 1008 that faces the thrust disc 1002.

Further, the example magnet 1014 is embedded in and/or adjacent to a surface of the aft thrust pad 1012. For example, the magnet 1014 can extend along a surface of the aft thrust pad 1012. In this example, the magnet 1014 is embedded in a surface of the aft thrust pad 1012 that faces the thrust disc 1002. The example magnets 1004, 1006 are embedded in and/or adjacent to the thrust disc 1002. In particular, the magnet 1004 is embedded in a surface of the thrust disc 1002 that faces the forward thrust pad 1008 (e.g., the magnet 1010 embedded in the forward thrust pad 1008). Additionally, the magnet 1006 is embedded in a surface of the thrust disc 1002 that faces the aft thrust pad 1012 (e.g., the magnet 1014 embedded in the aft thrust pad 1012).

In some examples, the magnets 1004, 1006 extend along the surfaces of the thrust disc 1002. In some examples, the magnets 1004, 1006, 1010, 1014 are substantially parallel (e.g., +/−2 degrees) to the thrust disc 1002. In this example, like poles of the magnets 1004, 1010 face each other and like poles of the magnets 1006, 1014 face each other. Accordingly, the example magnet 1004 can repel the magnet 1010 embedded in the forward thrust pad 1008. Additionally, the example magnet 1006 can repel the magnet 1014 embedded in the aft thrust pad 1012. In some examples, the repelling force of the magnets 1004, 1006, 1010, 1014 can cause the thrust disc 1002 to move. In some examples, the force interactions between the magnets 1004, 1006, 1010, 1014 can prevent the thrust disc 1002 from contacting the thrust pads 1008, 1012.

In FIG. 10, the forward thrust pad 1008 and the aft thrust pad 1012 are spaced at a distance by a spacer 1016 to define a bearing chamber 1018 when the fluid can collect and become pressurized by the rotating thrust disc 1002. The system 1000 includes an opening 1020 to permit the fluid to enter the bearing chamber 1018, become pressurized on forward and aft sides of the thrust disc 1002, bear axial loads of the shaft 432, and flow out of the bearing chamber 1018.

In some examples, a forward displacement of the thrust disc 1002 in the bearing chamber 1018 due to the forward thrust 448 of the shaft 432 can cause the thrust disc 1002 to move forward in the bearing chamber 1018. In such examples, the magnets 1004, 1010 move closer to one another. Accordingly, the magnetic repulsion of the magnets 1004, 1010 increases as the distance between the magnets 1004, 1010 (e.g., between like poles of the magnets 1004, 1010) decreases. Thus, the forward thrust pad 1008 and the thrust disc 1002 will push away from each other due to the interaction between the magnetic fields of their respective embedded magnets 1004, 1010. In some examples, the thrust disc 1002 can return to a central position (as shown in FIG. 10) due to the magnetic repulsion of the magnets 1004, 1010.

In another example, an aft displacement of the thrust disc 1002 in the bearing chamber 1018 due to the aft thrust 446 of the shaft 432 can cause the thrust disc 1002 to move aft in the bearing chamber 1018. In such examples, the magnets 1006, 1014 move closer to one another. Accordingly, the magnetic repulsion of the magnets 1006, 1014 increases as the distance between the magnets 1006, 1014 (e.g., between like poles of the magnets 1006, 1014) decreases. Thus, the aft thrust pad 1012 and the thrust disc 1002 will push away from each other due to the interaction between the magnetic fields of their respective embedded magnets 1006, 1014. In some examples, the thrust disc 1002 can return to a central position (as shown in FIG. 10) due to the magnetic repulsion of the magnets 1006, 1014. Thus, the example system 1100 can dynamically balance fluid pressure on forward and aft sides of the thrust disc 1002 based on at least one of the magnets 1004, 1006, 1010, 1014.

Figure 11:
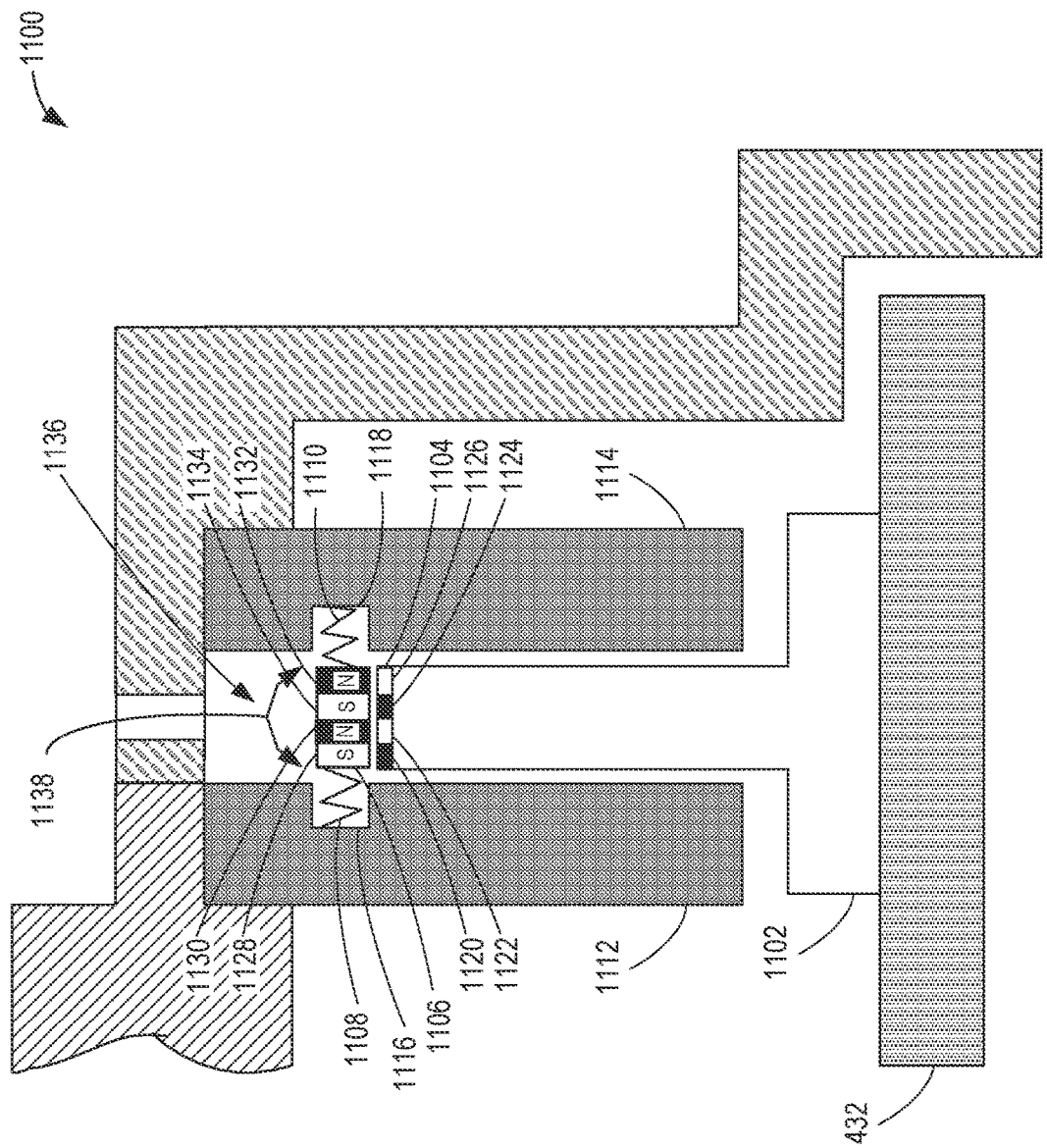
FIG. 11 is a schematic illustration of an example third dynamic thrust bearing system in accordance with the teachings disclosed herein.

FIG. 11 is a schematic illustration of an example third dynamic thrust bearing system 1100 including a thrust disc 1102, magnets 1104, 1106, and springs 1108, 1110. The example spring 1108 is positioned between the magnet 1106 and a forward thrust pad 1112 and the spring 1110 positioned between the magnet 1106 and an aft thrust pad 1114. The forward thrust pad 1112 includes a cavity 1116 positioned in a surface of the forward thrust pad 1112, and the aft thrust pad 1114 includes a cavity 1118 positioned in a surface of the aft thrust pad 1114. Accordingly, the spring 1108 extends from an inner wall of the cavity 1116 towards the magnet 1106. In this example, a first end of the magnet 1106 is coupled to the spring 1108. Further, the spring 1110 extends from an inner wall of the cavity 1118 towards the magnet 1106. The example spring 1110 is coupled to a second end of the magnet 1106.

In FIG. 11, the magnet 1104 is positioned on a surface (e.g., circumferential surface) of the thrust disc 1102. The example magnet 1104 can interact with (e.g., attract) the magnet 1106 positioned between the springs 1108, 1110 and the thrust pads 1112, 1114. For example, poles 1120, 1122, 1124, 1126 of the magnet 1104 are aligned to poles 1128, 1130, 1132, 1134 of the magnet 1106. Accordingly, the poles 1120, 1128 are magnetically attracted to one another, the poles 1122, 1130 are magnetically attracted to one another, the poles 1124, 1134 are magnetically attracted to one another, and the poles 1126, 1132 are magnetically attracted to one another.

In some examples, a forward displacement of the thrust disc 1102 in a bearing chamber 1136 due to the forward thrust 448 of the shaft 432 can cause the thrust disc 1102 to move forward in the bearing chamber 1136. In such examples, the magnet 1104 may become offset from the magnet 1106. Accordingly, the magnetic attraction between the magnets 1104, 1106 (e.g., between at least the poles 1120, 1128) can cause at least the magnetic poles 1120, 1128 to move closer to each other. Thus, the forward thrust pad 1112 and the thrust disc 1102 will push away from each other due to the attraction between the magnets 1104, 1106, and the magnet 1106 can divert more fluid to the forward side of the thrust disc 1102. In some examples, the thrust disc 1102 can return to a central position (as shown in FIG. 11) due to the magnetic attraction of the magnets 1104, 1106. In some examples, the stiffness in the spring 1108 and/or the spring 1110 can adjust (e.g., track, move, position, etc.) the magnet 1106 and, subsequently, the thrust disc 1102 back to a central position (as shown in FIG. 11).

In some examples, an aft displacement of the thrust disc 1102 in the bearing chamber 1136 due to the aft thrust 446 of the shaft 432 can cause the thrust disc 1102 to move aft in the bearing chamber 1136. In such examples, the magnet 1104 may become offset from the magnet 1106. Accordingly, the magnetic attraction between the magnets 1104, 1106 (e.g., between at least the poles 1132, 1126) can cause at least the magnetic poles 1126, 1132 to move closer to each other. Thus, the aft thrust pad 1114 and the thrust disc 1102 will push away from each other due to the attraction between the magnetic fields of the magnets 1104, 1106, and the magnet 1106 can divert more fluid to the aft side of the thrust disc 1102. In some examples, the thrust disc 1102 can return to a central position (as shown in FIG. 11) due to the magnetic attraction of the magnets 1104, 1106. Thus, the example system 1100 can dynamically balance fluid pressure on forward and aft sides of the thrust disc 1102 based on at least one of the magnets 1104, 1106 and/or the springs 1108, 1110. In some examples, the magnet 1106 at least partially diverts (e.g., guides) the fluid to forward and aft sides of the thrust disc 1102, as shown by example arrows 1138.

In some examples, the systems 400, 500, 600, 1000, 1100 include means for accelerating. For example, the means for accelerating may be implemented by the impeller shaft 432 in FIGS. 4, 5, 6, 10, and 11, and/or any other impeller shafts described herein.

In some examples, the systems 400, 500, 600, 1000, 1100 include means for separating (e.g., first means for separating). For example, the means for separating may be implemented by the thrust disc 438 in FIGS. 4 and 5, the thrust disc 606 in FIGS. 6-9, the thrust disc 1002 in FIG. 10, the thrust disc 1102 in FIG. 11, and/or any other thrust discs described herein.

In some examples, the systems 400, 500, 600, 1000, 1100 include first means for supporting. For example, the first means for supporting may be implemented by the forward thrust pad 502 in FIG. 5, the forward thrust pad 610 in FIGS.

6-8, the forward thrust pad 1008 in FIG. 10, the forward thrust pad 1112 in FIG. 11, and/or any other forward thrust pads described herein.

In some examples, the systems 400, 500, 600, 1000, 1100 include second means for supporting. For example, the second means for supporting may be implemented by the aft thrust pad 504 in FIG. 5, the aft thrust pad 612 in FIGS. 6-8, the aft thrust pad 1012 in FIG. 10, the aft thrust pad 1114 in FIG. 11, and/or any other aft thrust pads described herein.

In some examples, the systems 400, 500, 600, 1000, 1100 include first means for coupling. For example, the first means for coupling may be implemented by the magnets 648, 650 in FIGS. 6-8, the magnets 1004, 1006 in FIG. 10, the magnet 1104 in FIG. 10, and/or any other magnets described herein.

In some examples, the systems 400, 500, 600, 1000, 1100 include second means for coupling. For example, the second means for coupling may be implemented by the magnet 646 in FIGS. 6-8, the magnet 1010 in FIG. 10, the magnet 1106 in FIG. 11, and/or any other magnets described herein.

In some examples, the systems 400, 500, 600, 1000, 1100 include third means for coupling. For example, the third means for coupling may be implemented by the magnet 652 in FIGS. 6-8, the magnet 1014 in FIG. 10, the magnet 1106 in FIG. 11, and/or any other magnets described herein.

In some examples, the systems 400, 500, 600, 1000, 1100 include fourth means for coupling. For example, the fourth means for coupling may be implemented by the magnet 650 in FIGS. 6-8, the magnet 1006 in FIG. 10, the magnet 1104 in FIG. 10, and/or any other magnets described herein.

In some examples, the systems 400, 500, 600, 1000, 1100 include second, third, and fourth means for separating. For example, the second means for separating may be implemented by the branch 640 in FIGS. 6-8 and/or any other branch described herein, the third means for separating may be implemented by the branch 642 in FIGS. 6-8 and/or any other branch described herein, the fourth means for separating may be implemented by the branch 644 in FIGS. 6-8 and/or any other branch described herein.

In some examples, the systems 400, 500, 600, 1000, 1100 include means for sealing. For example, the means for sealing may be implemented by the sleeve 608 in FIGS. 6-8, the forward sleeve portion 626 in FIGS. 6-8, the aft sleeve portion 628 in FIGS. 6-8, and/or any other sleeve described herein.

In some examples, the systems 400, 500, 600, 1000, 1100 include first and second means for engaging. For example, the first means for engaging may be implemented by the spring 632 in FIGS. 6-8, the spring 1108 in FIG. 11, and/or any other spring described herein. Further, the second means for engaging may be implemented by the spring 634 in FIGS. 6-8, the spring 1110 in FIG. 11, and/or any other spring described herein.

Magnetic thrust bearing systems for dynamically supporting shafts in pumps are disclosed herein. As a pump (e.g., a centrifugal pump) operates, an impeller/expeller of the pump experiences forward and aft thrusts which can cause an impeller shaft to axially move forward and aft by an amount (e.g., 0.001 in, 0.005 in, 0.010 in, etc.). Movements of the impeller shaft and/or prolonged rotation of the impeller shaft in displaced positions can cause the impeller shaft and/or parts coupled thereto to interfere with other internal parts (e.g., bearings, housings, motor(s), etc.) of the pump, which can cause damage to the pump and/or the internal parts and can cause energy losses due to friction forces at the interferences. Example magnetic thrust bearing systems disclosed herein reduce damage to the pump through reduced axial movement of the impeller shaft. Example magnetic thrust bearing systems disclosed herein increase the energy efficiency of the pump through dynamic adjustment of the axial position of the impeller shaft in response to axial displacements of the impeller shaft.

Magnetic thrust bearing systems to dynamically support axial thrust in pumps are disclosed herein. Further examples and combinations thereof include the following:

Example 1 includes a thrust bearing system to dynamically support thrust in a pump, the thrust bearing system comprising a thrust disc coupled to an impeller shaft, the thrust disc protruding radially outward from the impeller shaft, the impeller shaft coupled to an impeller, the thrust disc including a first magnet, the first magnet positioned on a surface of the thrust disc, a first thrust pad coupled to a body of the pump, the first thrust pad protruding radially inward toward the impeller shaft, the first thrust pad positioned on a forward side of the thrust disc, the first thrust pad including a second magnet positioned adjacent to a first surface of the first thrust pad, the first surface facing the thrust disc, and a second thrust pad coupled to the body of the pump, the second thrust pad protruding radially inward toward the impeller shaft, the second thrust pad positioned on an aft side of the thrust disc, the second thrust pad including a third magnet positioned adjacent to a second surface of the second thrust pad, the second surface facing the thrust disc.

Example 2 includes the thrust bearing system of any preceding clause, wherein the first magnet and the second magnet repel each other, and the first magnet and the third magnet repel each other.

Example 3 includes the thrust bearing system of any preceding clause, wherein the surface of the thrust disc is a circumferential surface.

Example 4 includes the thrust bearing system of any preceding clause, wherein the first magnet is embedded in the surface of the thrust disc, the first magnet facing the second magnet, the thrust disc further including a fourth magnet embedded in the surface of the thrust disc, the fourth magnet facing the third magnet.

Example 5 includes the thrust bearing system of any preceding clause, wherein the first magnet and the second magnet repel each other, and the fourth magnet and the third magnet repel each other.

Example 6 includes the thrust bearing system of any preceding clause, wherein the thrust disc further includes a first branch, a second branch, and a third branch positioned on the surface of the thrust disc, the first, second, and third branches protruding radially outward from a central axis of the thrust bearing system, the second branch positioned between the first branch and the third branch, the first branch facing the first thrust pad, the third branch facing the second thrust pad, and a fourth magnet surrounding the third branch and the first magnet surrounding the first branch.

Example 7 includes the thrust bearing system of any preceding clause, wherein the fourth magnet and the third magnet repel each other, and the first magnet and the second magnet repel each other.

Example 8 includes the thrust bearing system of any preceding clause, wherein the thrust disc further includes a forward channel and an aft channel, the forward channel extending from the surface of the thrust disc to the forward side of the thrust disc, the aft channel extending from the surface of the thrust disc to the aft side of the thrust disc.

Example 9 includes the thrust bearing system of any preceding clause, wherein an inlet of the forward channel is positioned between the first and second branches, and an inlet of the aft channel is positioned between the second and third branches.

Example 10 includes the thrust bearing system of any preceding clause, further including a sleeve at least partially surrounding the thrust disc, the sleeve positioned between the first and second thrust pads, the second magnet embedded in the sleeve and the third magnet embedded in the sleeve, a first spring positioned between the sleeve and the first thrust pad, and a second spring positioned between the sleeve and the second thrust pad.

Example 11 includes the thrust bearing system of any preceding clause, wherein the first spring extends from the first surface of the first thrust pad to a first portion of the sleeve, and the second spring extends from the second surface of the second thrust pad to a second portion of the sleeve.

Example 12 includes the thrust bearing system of any preceding clause, wherein at least one of the second magnet or the third magnet are coupled to the first spring and the second spring.

Example 13 includes the thrust bearing system of any preceding clause, wherein the sleeve further includes at least one aperture to permit fluid flow therethrough, the aperture extending through opposing surfaces of the sleeve.

Example 14 includes a thrust bearing system to dynamically support axial thrust in a pump, the thrust bearing system comprising a first thrust pad and a second thrust pad, the first thrust pad opposing the second thrust pad, a thrust disc positioned between the first thrust pad and the second thrust pad, and a magnet assembly embedded in the first thrust pad, the second thrust pad, and the thrust disc.

Example 15 includes the thrust bearing system of any preceding clause, wherein the magnet assembly includes a first magnet embedded in a surface of the first thrust pad, the first magnet extending along the surface of the first thrust pad, the surface of the first thrust pad facing the thrust disc, a second magnet embedded in a surface of the second thrust pad, the second magnet extending along the surface of the second thrust pad, the surface of the second thrust pad facing the thrust disc, and a third magnet and a fourth magnet embedded in the thrust disc, the third and fourth magnets positioned on opposing sides of the thrust disc, the third magnet facing the first magnet, the fourth magnet facing the second magnet.

Example 16 includes the thrust bearing system of any preceding clause, wherein the first magnet and the third magnet repel each other, and the second magnet and the fourth magnet repel each other.

Example 17 includes the thrust bearing system of any preceding clause, wherein the first, second, third, and fourth magnets are substantially parallel to the thrust disc, the thrust disc protruding radially from an impeller shaft of the pump.

Example 18 includes a thrust bearing system to dynamically support thrust in a pump, the thrust bearing system comprising a thrust disc coupled to an impeller shaft, the thrust disc protruding radially outward from the impeller shaft, the impeller shaft coupled to an impeller, the thrust disc including a first magnet, the first magnet positioned on a circumferential surface of the thrust disc, a first thrust pad coupled to a body of the pump, the first thrust pad protruding radially inward toward the impeller shaft, the first thrust pad positioned on a forward side of the thrust disc, the first thrust pad including a first spring extending from a surface of the first thrust pad, the surface of the first thrust pad facing the thrust disc, a second thrust pad coupled to the body of the pump, the second thrust pad protruding radially inward toward the impeller shaft, the second thrust pad positioned on an aft side of the thrust disc, the second thrust pad including a second spring extending from a surface of the second thrust pad, the surface of the second thrust pad facing the thrust disc, and a second magnet positioned between the first thrust pad and the second thrust pad, a first end of the second magnet coupled to the first spring and a second end of the second magnet coupled to the second spring.

Example 19 includes the thrust bearing system of any preceding clause, wherein the first magnet and the second magnet magnetically attract each other.

Example 20 includes the thrust bearing system of any preceding clause, wherein the first thrust pad includes a first cavity in the surface of the first thrust pad and the second thrust pad includes a second cavity in the surface of the second thrust pad, the first spring extending from an inner wall of the first cavity to the second magnet, the second spring extending from an inner wall of the second cavity to the second magnet.

Example 21 includes the thrust bearing system of any preceding clause, further including an opening to allow fluid to flow into the thrust bearing system, the second magnet positioned between the first magnet and the opening.

Example 22 includes the thrust bearing system of any preceding clause, wherein the second magnet at least partially diverts the fluid from the opening to forward and aft sides of the thrust disc.

Example 23 includes an apparatus to dynamically support thrust in a pump, the apparatus comprising means for separating coupled to a means for accelerating, the means for separating protruding radially outward from the means for accelerating, the means for accelerating coupled to an impeller, the means for separating including a first means for coupling, the first means for coupling positioned on a surface of the means for separating, a first means for supporting coupled to a body of the pump, the first means for supporting protruding radially inward toward the means for accelerating, the first means for supporting positioned on a forward side of the means for separating, the first means for supporting including a second means for coupling positioned adjacent to a first surface of the first means for supporting, the first surface facing the means for separating, and a second means for supporting coupled to the body of the pump, the second means for supporting protruding radially inward toward the means for accelerating, the second means for supporting positioned on an aft side of the means for separating, the second means for supporting including a third means for coupling positioned adjacent to a second surface of the second means for supporting, the second surface facing the means for separating.

Example 24 includes the apparatus of any preceding clause, wherein the first means for coupling and the second means for coupling repel each other, and the first means for coupling and the third means for coupling repel each other.

Example 25 includes the apparatus of any preceding clause, wherein the first means for coupling is embedded in the surface of the means for separating, the first means for coupling facing the second means for coupling, the means for separating further including a fourth means for coupling embedded in the surface of the means for separating, the fourth means for coupling facing the third means for coupling.

Example 26 includes the apparatus of any preceding clause, wherein the first means for coupling and the second means for coupling repel each other, and the fourth means for coupling and the third means for coupling repel each other.

Example 27 includes the apparatus of any preceding clause, wherein the means for separating is a first means for separating, wherein the first means for separating further includes a second means for separating, a third means for separating, and a fourth means for separating positioned on the surface of the first means for separating, the second, third, and fourth means for separating protruding radially outward from a central axis of the apparatus, the third means for separating positioned between the second means for separating and the fourth means for separating, the second means for separating facing the first means for supporting, the fourth means for separating facing the second means for supporting, and a fourth means for coupling surrounding the fourth means for separating and the first means for coupling surrounding the second means for separating.

Example 28 includes the apparatus of any preceding clause, wherein the fourth means for coupling and the third means for coupling repel each other, and the first means for coupling and the second means for coupling repel each other.

Example 29 includes the apparatus of any preceding clause, wherein the first means for separating further includes a forward channel and an aft channel, the forward channel extending from the surface of the means for separating to the forward side of the means for separating, the aft channel extending from the surface of the means for separating to the aft side of the means for separating.

Example 30 includes the apparatus of any preceding clause, wherein an inlet of the forward channel is positioned between the second and third means for separating, and an inlet of the aft channel is positioned between the third and fourth means for separating.

Example 31 includes the apparatus of any preceding clause, further including means for sealing at least partially surrounding the first means for separating, the means for sealing positioned between the first and second means for supporting, the second means for coupling embedded in the means for sealing and the third means for coupling embedded in the means for sealing, a first means for engaging positioned between the means for sealing and the first means for supporting, and a second means for engaging positioned between the means for sealing and the second means for supporting.

Example 32 includes the apparatus of any preceding clause, wherein the first means for engaging extends from the first surface of the first means for supporting to a first portion of the means for sealing, and the second means for engaging extends from the second surface of the second means for supporting to a second portion of the means for sealing.

Example 33 includes the apparatus of any preceding clause, wherein the means for sealing further includes at least one aperture to permit fluid flow therethrough, the aperture extending through opposing surfaces of the means for sealing.

Example 34 includes a thrust bearing system comprising a thrust disc coupled to a shaft, the thrust disc protruding radially outward from the shaft, the thrust disc including at least one first magnet, the at least one first magnet positioned on a surface of the thrust disc, the at least one first magnet including a first pole positioned at a forward side of the thrust disc and a second pole positioned at an aft side of the thrust disc, a first thrust pad positioned on the forward side of the thrust disc, the first thrust pad including a first surface facing the forward side of the thrust disc, the first thrust pad including a second magnet with a third pole, the third pole positioned adjacent to the forward side of the thrust disc, the third pole and the first pole having the same polarity, a second thrust pad positioned on the aft side of the thrust disc, the second thrust pad including a second surface facing the aft side of the thrust disc, the second thrust pad including a third magnet with a fourth pole, the fourth pole positioned adjacent to the aft side of the thrust disc, the fourth pole and the second pole having the same polarity, and a sleeve at least partially surrounding the thrust disc, the sleeve positioned between the first and second thrust pads, the second magnet embedded in the sleeve and the third magnet embedded in the sleeve.

Example 35 includes the thrust bearing system of any preceding clause, wherein the shaft is an impeller shaft, the impeller shaft coupled to an impeller.

Example 36 includes the thrust bearing system of any preceding clause, wherein the at least one first magnet is embedded in the surface of the thrust disc, the at least one first magnet facing the second magnet, the at least one first magnet includes at least two magnets, a first one of the at least two magnets positioned at the forward side and a second one of the at least two magnets positioned at the aft side, the first one including the first pole and the second one including the second pole.

Example 37 includes the thrust bearing system of any preceding clause, wherein the thrust disc further includes a first wall, a second wall, and a third wall extending from the surface of the thrust disc, the first, second, and third walls protruding radially outward from a central axis of the thrust bearing system, the second wall positioned between the first wall and the third wall, the first wall facing the first thrust pad, the third wall facing the second thrust pad, and a fourth magnet surrounding the third wall and the at least one first magnet surrounding the first wall.

Example 38 includes the thrust bearing system of any preceding clause, wherein the thrust disc further includes a forward channel and an aft channel, the forward channel extending from the surface of the thrust disc to the forward side of the thrust disc, the aft channel extending from the surface of the thrust disc to the aft side of the thrust disc.

Example 39 includes the thrust bearing system of any preceding clause, wherein an inlet of the forward channel is positioned between the first and second walls, and an inlet of the aft channel is positioned between the second and third walls.

Example 40 includes the thrust bearing system of any preceding clause, further including a first spring positioned between the sleeve and the first thrust pad, and a second spring positioned between the sleeve and the second thrust pad.

Example 41 includes the thrust bearing system of any preceding clause, wherein the first spring extends from the first surface of the first thrust pad to a first portion of the sleeve, and the second spring extends from the second surface of the second thrust pad to a second portion of the sleeve.

Example 42 includes the thrust bearing system of any preceding clause, wherein the first and second springs resist axial displacement of the sleeve.

Example 43 includes the thrust bearing system of any preceding clause, wherein the sleeve further includes at least two apertures to permit fluid flow therethrough, the at least two apertures extending through opposing surfaces of the sleeve.

Example 44 includes the thrust bearing system of any preceding clause, wherein fluid flows through a first one of the at least two apertures when the thrust disc moves forward in the system, the forward channel to permit fluid to flow to the forward side of the thrust disc.

Example 45 includes the thrust bearing system of any preceding clause, wherein the at least one first magnet repels the second magnet when the thrust disc moves forward in the system, the at least one first magnet and the second magnet repel to move the thrust disc aft in the system.

Example 46 includes the thrust bearing system of any preceding clause, wherein a portion of the sleeve blocks fluid flow through the aft channel.

Example 47 includes the thrust bearing system of any preceding clause, wherein fluid flows through a second one of the at least two apertures when the thrust disc moves aft in the system, the aft channel to permit fluid flow to the aft side of the thrust disc.

Example 48 includes the thrust bearing system of any preceding clause, wherein the fourth magnet repels the third magnet when the thrust disc moves aft in the system, the fourth and third magnets repel to move the thrust disc forward in the system.

Example 49 includes a thrust bearing system to dynamically support axial thrust in a pump, the thrust bearing system comprising a first thrust pad and a second thrust pad, the first thrust pad opposing the second thrust pad, a thrust disc positioned between the first thrust pad and the second thrust pad, a first magnet embedded in a surface of the first thrust pad, the first magnet extending along the surface of the first thrust pad, the surface of the first thrust pad facing the thrust disc, a second magnet embedded in a surface of the second thrust pad, the second magnet extending along the surface of the second thrust pad, the surface of the second thrust pad facing the thrust disc, and a third magnet and a fourth magnet embedded in the thrust disc, the third and fourth magnets positioned on opposing sides of the thrust disc, the third magnet facing the first magnet, the fourth magnet facing the second magnet.

Example 50 includes the thrust bearing system of any preceding clause, wherein the first, second, third, and fourth magnets are substantially parallel to the thrust disc, the thrust disc protruding radially from an impeller shaft of a pump.

Example 51 includes the thrust bearing system of any preceding clause, wherein the first magnet and the third magnet repel to move the thrust disc aft in the system.

Example 52 includes the thrust bearing system of any preceding clause, wherein the second magnet and the fourth magnet repel to move the thrust disc forward in the system.

Example 53 includes a method comprising in response to axial movement of a thrust disc in a thrust bearing system, aligning a first aperture of a sleeve and at least one channel of the thrust disc, the at least one channel permitting fluid flow to a side of the thrust disc, the sleeve positioned between thrust pads of the thrust bearing system, at least a portion of the sleeve blocking fluid flow through a second channel of the thrust disc, moving the thrust disc in a direction opposite of the axial movement via first and second magnets, the first magnet positioned on the thrust disc, the second magnet positioned on the sleeve, the first magnet and the second magnet having the same polarity, and aligning the thrust disc to a center position via first and second springs, the first spring positioned between the sleeve and a first one of the thrust pads and the second spring positioned between the sleeve and a second one of the thrust pads, the aligned thrust disc to permit fluid flow through the first aperture and a second aperture of the sleeve.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A thrust bearing system comprising:
   a thrust disc coupled to a shaft, the thrust disc protruding radially outward from the shaft, the thrust disc including at least one first magnet, the at least one first magnet positioned on a surface of the thrust disc, the at least one first magnet including a first pole positioned at a forward side of the thrust disc and a second pole positioned at an aft side of the thrust disc;
   a first thrust pad positioned on the forward side of the thrust disc, the first thrust pad including a first surface facing the forward side of the thrust disc, the first thrust pad including a second magnet with a third pole, the third pole positioned adjacent to the forward side of the thrust disc, the third pole and the first pole having the same polarity;
   a second thrust pad positioned on the aft side of the thrust disc, the second thrust pad including a second surface facing the aft side of the thrust disc, the second thrust pad including a third magnet with a fourth pole, the fourth pole positioned adjacent to the aft side of the thrust disc, the fourth pole and the second pole having the same polarity; and
   a sleeve at least partially surrounding the thrust disc, the sleeve positioned between the first and second thrust pads, the second magnet embedded in the sleeve and the third magnet embedded in the sleeve,
   wherein the thrust disc includes a first wall, a second wall, and a third wall extending from the surface of the thrust disc, the first, second, and third walls protruding radially outward from a central axis of the thrust bearing system, the second wall positioned between the first wall and the third wall, the first wall facing the first thrust pad, the third wall facing the second thrust pad; and
   a fourth magnet surrounding the third wall and the at least one first magnet surrounding the first wall.

2. The thrust bearing system of claim 1, wherein the shaft is an impeller shaft, the impeller shaft coupled to an impeller.

3. The thrust bearing system of claim 1, wherein the first magnet is embedded in the surface of the thrust disc, the first magnet facing the second magnet, the thrust disc further including:
   a fourth magnet embedded in the surface of the thrust disc, the fourth magnet facing the third magnet, the fourth magnet including a fifth pole, the fifth pole and the fourth pole having the same polarity.

4. The thrust bearing system of claim 1, wherein the thrust disc further includes a forward channel and an aft channel, the forward channel extending from the surface of the thrust disc to the forward side of the thrust disc, the aft channel extending from the surface of the thrust disc to the aft side of the thrust disc.

5. The thrust bearing system of claim 4, wherein an inlet of the forward channel is positioned between the first and second walls, and an inlet of the aft channel is positioned between the second and third walls.

6. The thrust bearing system of claim 5, further including:
a first spring positioned between the sleeve and the first thrust pad; and
a second spring positioned between the sleeve and the second thrust pad.

7. The thrust bearing system of claim 6, wherein the first spring extends from the first surface of the first thrust pad to a first portion of the sleeve, and the second spring extends from the second surface of the second thrust pad to a second portion of the sleeve.

8. The thrust bearing system of claim 6, wherein the first and second springs resist axial displacement of the sleeve.

9. The thrust bearing system of claim 6, wherein the sleeve further includes at least two apertures to permit fluid flow therethrough, the at least two apertures extending through opposing surfaces of the sleeve.

10. The thrust bearing system of claim 9, wherein fluid flows through a first one of the at least two apertures when the thrust disc moves forward in the system, the forward channel to permit fluid to flow to the forward side of the thrust disc.

11. The thrust bearing system of claim 10, wherein the first magnet repels the second magnet when the thrust disc moves forward in the system, the first and second magnets repel to move the thrust disc aft in the system.

12. The thrust bearing system of claim 10, wherein a portion of the sleeve blocks fluid flow through the aft channel.

13. The thrust bearing system of claim 9, wherein fluid flows through a second one of the at least two apertures when the thrust disc moves aft in the system, the aft channel to permit fluid flow to the aft side of the thrust disc.

14. The thrust bearing system of claim 13, wherein the fourth magnet repels the third magnet when the thrust disc moves aft in the system, the fourth and third magnets repel to move the thrust disc forward in the system.

15. A thrust bearing system comprising:
a first thrust pad and a second thrust pad, the first thrust pad opposing the second thrust pad;
a thrust disc positioned between the first thrust pad and the second thrust pad, the thrust disc including at least one first magnet, the at least one first magnet positioned on a surface of the thrust disc, wherein the thrust disc includes:
a first wall, a second wall, and a third wall extending from a surface of the thrust disc, the first wall, the second wall, and the third wall protruding radially outward from a central axis of the thrust bearing system, the second wall positioned between the first wall and the third wall, the first wall facing the first thrust pad, the third wall facing the second thrust pad;
wherein the at least one first magnet is embedded in a surface of the first thrust pad, the first magnet extending along the surface of the first thrust pad, the surface of the first thrust pad facing the thrust disc;
a second magnet embedded in a surface of the second thrust pad, the second magnet extending along the surface of the second thrust pad, the surface of the second thrust pad facing the thrust disc;
a third magnet and a fourth magnet embedded in the thrust disc, the third and fourth magnets positioned on opposing sides of the thrust disc, the third magnet facing the first magnet, the fourth magnet facing the second magnet; and
a fourth magnet surrounding the third wall and the at least one first magnet surrounding the first wall.

16. The thrust bearing system of claim 15, wherein the first, second, third, and fourth magnets are substantially parallel to the thrust disc, the thrust disc protruding radially from an impeller shaft of a pump.

17. The thrust bearing system of claim 15, wherein the first magnet and the third magnet repel to move the thrust disc aft in the system.

18. The thrust bearing system of claim 15, wherein the second magnet and the fourth magnet repel to move the thrust disc forward in the system.

19. A method comprising:
in response to axial movement of a thrust disc in a thrust bearing system, aligning a first aperture of a sleeve and at least one channel of the thrust disc, the at least one channel permitting fluid flow to a side of the thrust disc, the sleeve positioned between thrust pads of the thrust bearing system, at least a portion of the sleeve blocking fluid flow through a second channel of the thrust disc;
moving the thrust disc in a direction opposite of the axial movement via first and second magnets, the first magnet positioned on the thrust disc, the second magnet positioned on the sleeve, the first magnet and the second magnet having the same polarity; and
aligning the thrust disc to a center position via first and second springs, the first spring positioned between the sleeve and a first one of the thrust pads and the second spring positioned between the sleeve and a second one of the thrust pads, the aligned thrust disc to permit fluid flow through the first aperture and a second aperture of the sleeve.

* * * * *